US011924158B2

(12) United States Patent
Sato

(10) Patent No.: US 11,924,158 B2
(45) Date of Patent: Mar. 5, 2024

(54) SYSTEM, INFORMATION PROCESSING METHOD, INFORMATION PROCESSING DEVICE, TERMINAL, AND MEDIUM

(71) Applicant: LINE Corporation, Tokyo (JP)

(72) Inventor: Yusuke Sato, Tokyo (JP)

(73) Assignee: LINE CORPORATION, Tokyo (JP)

( * ) Notice: Subject to any disclaimer, the term of this patent is extended or adjusted under 35 U.S.C. 154(b) by 0 days.

(21) Appl. No.: 17/900,265

(22) Filed: Aug. 31, 2022

(65) Prior Publication Data

US 2022/0417201 A1 Dec. 29, 2022

Related U.S. Application Data

(63) Continuation of application No. PCT/JP2021/001321, filed on Jan. 15, 2021.

(30) Foreign Application Priority Data

Mar. 2, 2020 (JP) .................................. 2020-034871

(51) Int. Cl.
*H04L 51/42* (2022.01)
*H04L 51/212* (2022.01)

(52) U.S. Cl.
CPC ............ *H04L 51/42* (2022.05); *H04L 51/212* (2022.05)

(58) Field of Classification Search
CPC ....... H04L 51/42; H04L 51/212; H04L 51/48; H04L 51/52; H04L 51/21; G06F 13/00; G06Q 50/10; G06Q 50/01; G06Q 50/30
See application file for complete search history.

(56) References Cited

U.S. PATENT DOCUMENTS

2014/0237394 A1 8/2014 Park
2015/0242879 A1\* 8/2015 Lee ..................... G06Q 30/0226
705/14.27

(Continued)

FOREIGN PATENT DOCUMENTS

JP H11-003348 A 1/1999
JP 2010-097329 A 4/2010

(Continued)

OTHER PUBLICATIONS

International Search Report PCT/ISA/210 for International Application No. PCT/JP2021/001321 dated Apr. 20, 2021. English translation has been provided.

(Continued)

*Primary Examiner* — Austin J Moreau
(74) *Attorney, Agent, or Firm* — Harness, Dickey & Pierce, P.L.C.

(57) ABSTRACT

A system for providing a messaging service includes a talk storage for storing talk information in association with first user identification information, the talk information including a message from a second user to a first user, the first user identification information identifying the first user, and processing circuitry for outputting specification information specifying the one or more registered messages based on an acquisition of one or more registered messages, adding a first registered message specified by the first specification information, to the talk storage, based on each of one or more first requests accompanied by the first user identification information and first specification information included in the specification information, and adding a second registered message specified by the second specification information, to the talk storage, based on each of one or more second requests accompanied by the first user identification (Continued)

information and second specification information included in the specification information.

16 Claims, 26 Drawing Sheets

(56) References Cited

U.S. PATENT DOCUMENTS

2017/0091818 A1 3/2017 Miyajima
2021/0263960 A1* 8/2021 Ogawa .................. G06F 16/335

FOREIGN PATENT DOCUMENTS

| JP | 2010097329 A | * | 4/2010 | |
| JP | 2014-013593 A | | 1/2014 | |
| JP | 2014-160467 A | | 9/2014 | |
| JP | 2015-005065 A | | 1/2015 | |
| JP | 2016-100018 A | | 5/2016 | |
| JP | 2016-157648 A | | 9/2016 | |
| JP | 2016157468 A | * | 9/2016 | ............. G06Q 30/02 |
| JP | 2017-68469 A | | 4/2017 | |
| JP | 2017-182510 A | | 10/2017 | |

OTHER PUBLICATIONS

Written Opinion PCT/ISA/237 for International Application No. PCT/JP2020/001321 dated Apr. 20, 2021.
Notice of Reasons for Refusal for Japanese Patent Application No. 2020-034871 dated Jul. 6, 2021. English translation has been provided.
Notice of Reasons for Refusal for Japanese Patent Application No. 2022-006993 dated Dec. 26, 2023, English translation included.

* cited by examiner

| USER NAME | APPLICATION ID (GENERAL ACCOUNT) | CONTACT INFORMATION | ATTRIBUTE INFORMATION | OTHER REGISTERED INFORMATION |
|---|---|---|---|---|
| X. X | ac0001 | {...} | {...} | {...} |
| Y. Y | ac0002 | {...} | {...} | {...} |
| Z. Z | ac0003 | {...} | {...} | {...} |
| ... | ... | ... | ... | ... |

| OPERATOR NAME | APPLICATION ID (OFFICIAL ACCOUNT) | OPERATOR CONTACT INFORMATION | OFFICIAL ACCOUNT NAME | OTHER REGISTERED INFORMATION |
|---|---|---|---|---|
| SHOP A | ac0020 | [ ... ] | SHOP A | [ ... ] |
| SHOP B | ac0030 | [ ... ] | SHOP B | [ ... ] |
| SHOP C | ac0040 | [ ... ] | SHOP C | [ ... ] |
| ... | ... | ... | ... | ... |

| APPLICATION ID | FRIEND'S APPLICATION ID | FRIEND'S USER NAME |
|---|---|---|
| ac0001 | ac0003 | Z. Z |
| | ac0020 | SHOP A |
| | ac0030 | SHOP B |
| | ⋮ | ⋮ |
| ⋮ | ⋮ | ⋮ |

FIG. 7

OA OPERATOR-SPECIFIC REGISTERED MESSAGE MANAGEMENT DATA — 155

| APPLICATION ID | ac0020 |
|---|---|

REGISTERED MESSAGE MANAGEMENT DATA

| OFFICIAL ACCOUNT NAME | SHOP A |
|---|---|

| REGISTERED URL | TEXT | ATTACHED IMAGE |
|---|---|---|
| https://msg.ee/ac0020/ms11111<br>OR<br>(msg.ee/ac0020/ms11111) | "20% OFF ALL SPORTS DRINKS" | https://coupon1/img11111xxx.jpg |
| https://msg.ee/ac0020/ms22222<br>OR<br>(msg.ee/ac0020/ms22222) | "TRY OUR NEW FINEST ROASTED COFFEE AT HALF PRICE." | https://coupon2/img22222xxx.jpg |
| ... | ... | ... |

FIG. 17

REGISTERED MESSAGE MANAGEMENT DATA

| OFFICIAL ACCOUNT NAME | SHOP A | | |
|---|---|---|---|
| REGISTERED URL | | TEXT | ATTACHED IMAGE |
| https://msg.ee/ac0020/ms11111 | | "20% OFF ALL SPORTS DRINKS" | https://coupon1/img1111xxx.jpg |
| | | "ELECTRONIC MONEY PAYMENT IS NOW AVAILABLE" | https://ms/img12345xxx.jpg |
| https://msg.ee/ac0020/ms22222 | | "TRY OUR NEW FINEST ROASTED COFFEE AT HALF PRICE." | https://coupon2/img22222xxx.jpg |
| | | "ELECTRONIC MONEY PAYMENT IS NOW AVAILABLE" | https://ms/img12345xxx.jpg |
| . . . | | . . . | . . . |

FIG. 18

REGISTERED MESSAGE MANAGEMENT DATA

| OFFICIAL ACCOUNT NAME | SHOP A | | | | |
|---|---|---|---|---|---|
| REGISTERED URL | CONDITION | TEXT | ATTACHED IMAGE | MAXIMUM NUMBER OF DOWNLOADS | NUMBER OF DOWNLOADS |
| https://msg.ee/ac0020/ms11111 | — | "20% OFF ALL SPORTS DRINKS" | https://coupon1/img11111xxx.jpg | — | 8573 |
| https://msg.ee/ac0020/ms22223 | MAXIMUM NUMBER OF DOWNLOADS NOT REACHED | "TRY OUR NEW FINEST ROASTED COFFEE AT HALF PRICE *LIMITED COUPON FOR THE FIRST 1,000 CUSTOMERS" | https://coupon2/img22223xxx.jpg | 1000 | 888 |
| | MAXIMUM NUMBER OF DOWNLOADS REACHED | "THIS CAMPAIGN HAS ENDED AS THE FIRST 1,000 ENTRIES HAVE BEEN RECEIVED. PLEASE WAIT FOR THE NEXT CAMPAIGN" | https://coupon2/img22224xxx.jpg | | |
| ... | ... | ... | ... | ... | ... |

FIG. 21

REGISTERED MESSAGE MANAGEMENT DATA

| OFFICIAL ACCOUNT NAME | SHOP A | | | | |
|---|---|---|---|---|---|
| REGISTERED URL | CONDITION | TEXT | ATTACHED IMAGE | MAXIMUM NUMBER OF DOWNLOADS | NUMBER OF DOWNLOADS |
| https://msg.ee/ac0020/ms11111 | MAXIMUM NUMBER OF DOWNLOADS NOT REACHED | "20% OFF ALL SPORTS DRINKS" | https://coupon1/img11111xxx.jpg | 5000 | 8576 |
| | MAXIMUM NUMBER OF DOWNLOADS REACHED | "THIS CAMPAIGN HAS ENDED AS THE FIRST 1,000 ENTRIES HAVE BEEN RECEIVED. PLEASE WAIT FOR THE NEXT CAMPAIGN" | https://coupon/img12345xxx.jpg | | |
| https://msg.ee/ac0020/ms22223 | MAXIMUM NUMBER OF DOWNLOADS NOT REACHED | "TRY OUR NEW FINEST ROASTED COFFEE AT HALF PRICE *LIMITED COUPON FOR THE FIRST 1,000 CUSTOMERS" | https://coupon2/img22223xxx.jpg | 1000 | 2585 |
| | MAXIMUM NUMBER OF DOWNLOADS REACHED | "THIS CAMPAIGN HAS ENDED AS THE FIRST 1,000 ENTRIES HAVE BEEN RECEIVED. PLEASE WAIT FOR THE NEXT CAMPAIGN" | https://coupon/img12345xxx.jpg | | |
| ... | ... | ... | ... | ... | ... |

FIG. 22

REGISTERED MESSAGE MANAGEMENT DATA

| OFFICIAL ACCOUNT NAME | REGISTERED URL | INFLOW ROUTE IDENTIFICATION URL | TEXT | ATTACHED IMAGE |
|---|---|---|---|---|
| SHOP A | https://msg.ee/ac0020/ms33333 | https://msg.ee/ac0020/ms33333/&{https://zzzz.sports} | "20% OFF ALL SPORTS DRINKS" | [ ... ] |
| | | | "FILL OUT THE QUESTIONNAIRE AND GO TO SEE THE TOKYO OLYMPICS!..." | [ ... ] |
| | | https://msg.ee/ac0020/ms33333/&{https:gourmet.yy.zz} | "TRY OUR NEW FINEST ROASTED COFFEE AT HALF PRICE" | [ ... ] |
| | | | "FILL OUT THE QUESTIONNAIRE AND RECEIVE AN INVITATION TO A HOTEL DINNER!..." | [ ... ] |
| | | https://msg.ee/ac0020/ms33333/&{default} | "THANK YOU FOR REGISTERING AS A FAVORITE" | [ ... ] |
| | | | "20% OFF ALL SPORTS DRINKS" | [ ... ] |
| | | | "TRY OUR NEW FINEST ROASTED COFFEE AT HALF PRICE" | [ ... ] |
| ... | | | ... | ... |

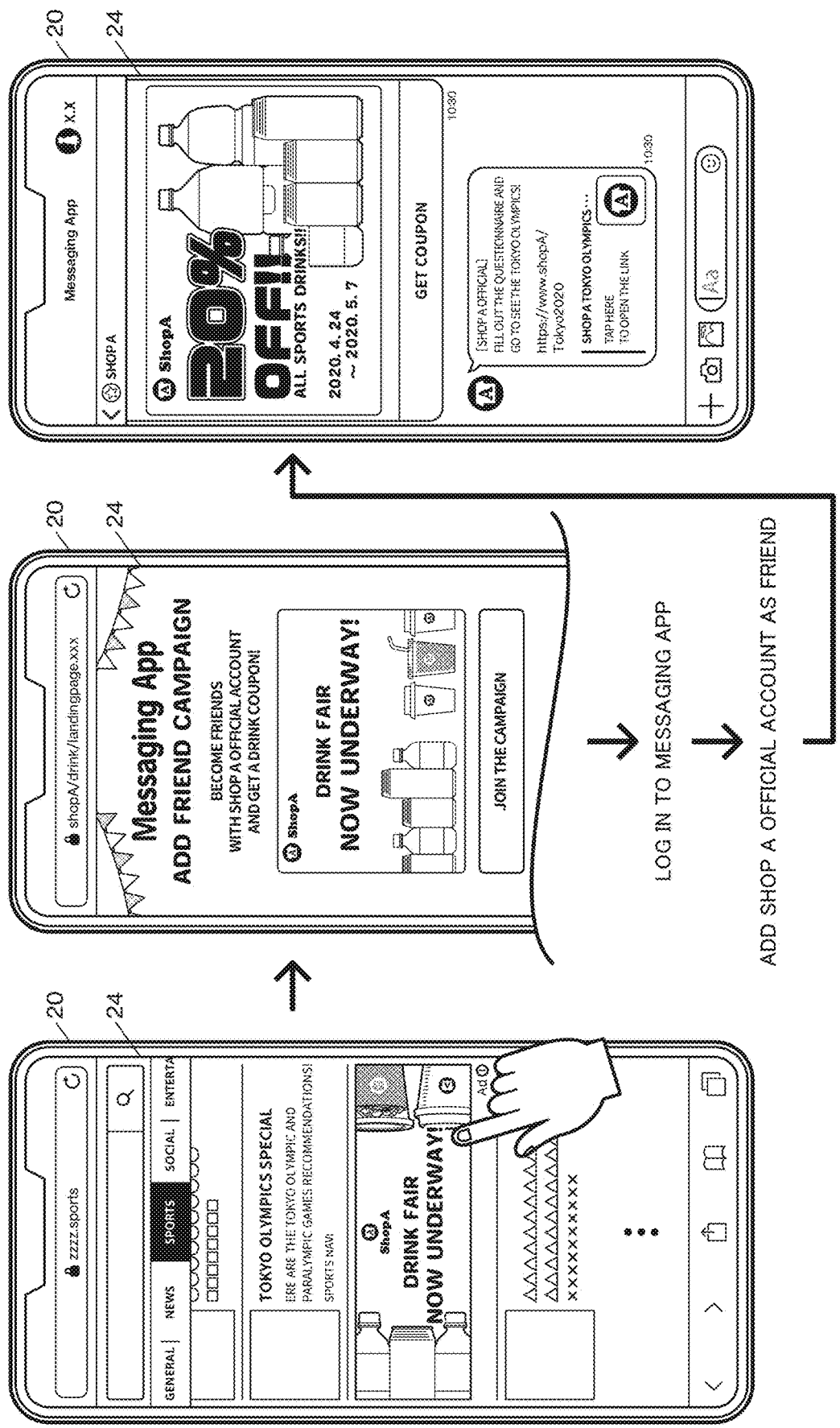

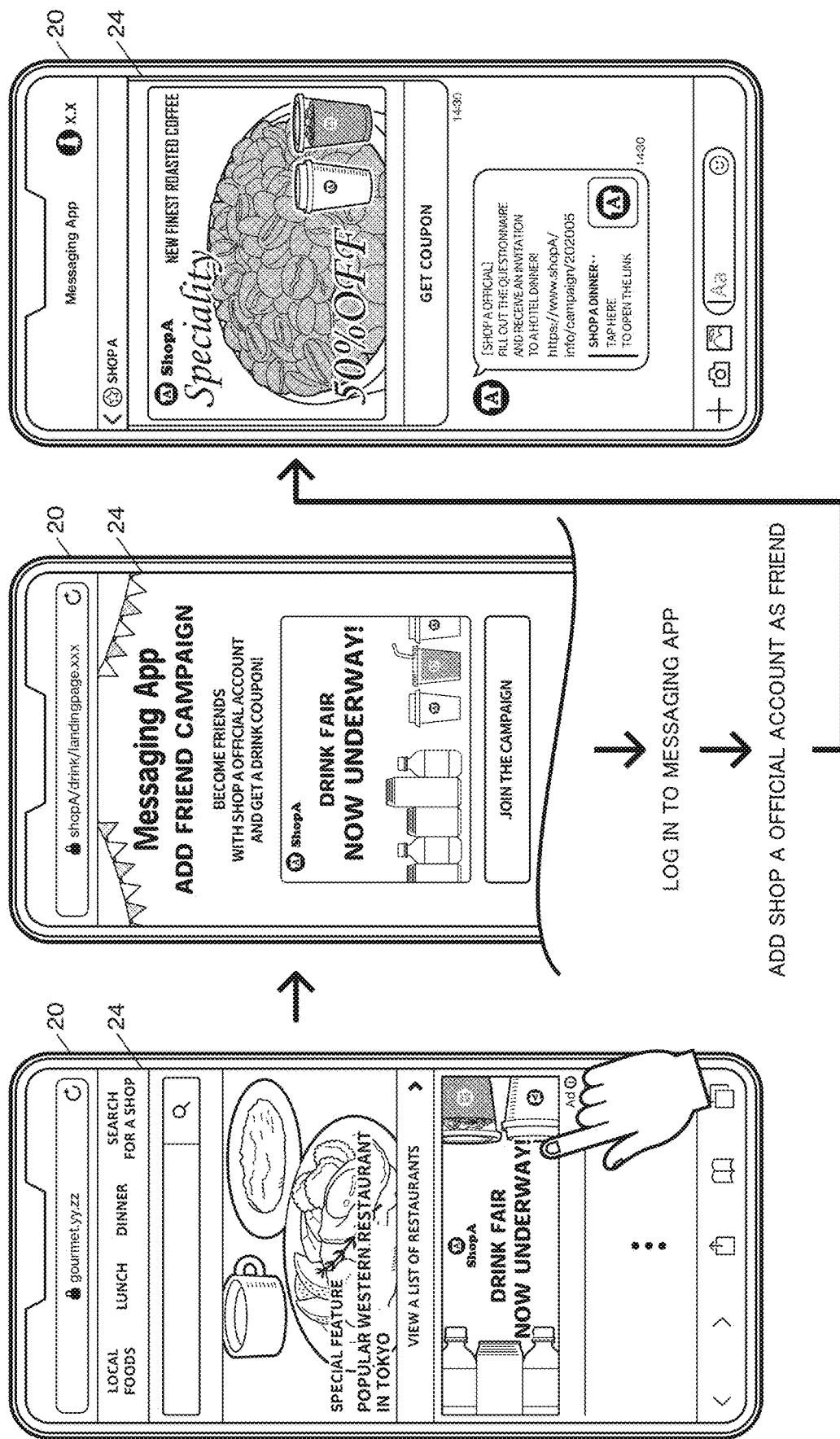

FIG. 26

| ACCESS DATE | REGISTERED URL | APPLICATION ID (GENERAL ACCOUNT) | ATTRIBUTE INFORMATION |
|---|---|---|---|
| 2020/02//:** | [ ... ] | ac0004 | [ ... ] |
| 2020/02//:** | [ ... ] | ac2861 | [ ... ] |
| 2010/02//:** | [ ... ] | ac0837 | [ ... ] |
| ... | ... | ... | ... |

158

NEW ←→ OLD

FIG. 27

OFFICIAL ACCOUNT-SPECIFIC AGGREGATED DATA

| OFFICIAL ACCOUNT NAME | SHOP A |
|---|---|

REGISTERED URL-SPECIFIC AGGREGATED DATA

| REGISTERED URL | https://msg.ee/ac0020/ms11111 |
|---|---|

INDIVIDUAL ACCESS COUNT AGGREGATED DATA

| AGGREGATION ITEM | | | ACCESS COUNT |
|---|---|---|---|
| ATTRIBUTE INFORMATION | SEX | MALE | 59458 |
| | | FEMALE | 78931 |
| | AGE | 10S | 8467 |
| | | 20S | 12058 |
| | | ⋮ | ⋮ |
| | OCCUPATION | COMPANY EMPLOYEE | 28505 |
| | | SELF-EMPLOYED | 7819 |
| | | ⋮ | ⋮ |
| TIME ZONE | | MIDNIGHT | 3891 |
| | | MORNING | 7591 |
| | | ⋮ | ⋮ |

TOTAL ACCESS COUNT AGGREGATED DATA

SYSTEM, INFORMATION PROCESSING METHOD, INFORMATION PROCESSING DEVICE, TERMINAL, AND MEDIUM

CROSS-REFERENCE TO RELATED APPLICATIONS

This application is a continuation of, and claims the benefit of priority under 35 U.S.C. §§ 120 and 365(c) from PCT International Application No. PCT/JP2021/001321, which has an International filing date of Jan. 15, 2021 and claims priority to Japanese Patent Application No. JP2020-34871 filed on Mar. 2, 2020 in the Japanese Patent Office (JPO), the entire disclosure of each of which is incorporated herein by reference.

BACKGROUND

Technical Field

The present disclosure relates to systems, information processing methods, information processing devices, terminals, and/or programs.

Description of Related Art

Techniques relating to a messaging service for enabling a plurality of users to send, receive, and browse messages through their respective terminals (for example, Patent Document 1) have been proposed.

SUMMARY

In an example embodiment of the present disclosure, a system that includes at least an information processing device for providing a messaging service includes a talk storage and processing circuitry. The talk storage is configured to store talk information in association with first user identification information, the talk information including a message from a second user to a first user, the first user identification information identifying the first user. The processing circuitry is configured to, based on an acquisition of one or more registered messages, output specification information that specifies the one or more registered messages, based on each of one or more first requests that is accompanied by the first user identification information and first specification information that is included in the specification information, add a first registered message specified by the first specification information, from among the one or more registered messages, to the talk storage, and based on each of one or more second requests that is accompanied by the first user identification information and second specification information that is included in the specification information, add a second registered message specified by the second specification information, from among the one or more registered messages, to the talk storage.

In an example embodiment of the present disclosure, an information processing method for a system that includes at least an information processing device for providing a messaging service includes storing, in a talk storage of the system, talk information in association with first user identification information, the talk information including a message from a second user to a first user, the first user identification information identifying the first user, based on an acquisition of one or more registered messages, outputting, by processing circuitry included in the system, specification information that specifies the one or more registered messages, based on each of one or more first requests that is accompanied by the first user identification information and first specification information that is included in the specification information, adding, by the processing circuitry, a first registered message specified by the first specification information, from among the one or more registered messages, to the talk storage, and based on each of one or more second requests that is accompanied by the first user identification information and second specification information that is included in the specification information, adding, by the processing circuitry, a second registered message specified by the second specification information, from among the one or more registered messages, to the talk storage.

In an example embodiment of the present disclosure, an information processing device for providing a messaging service includes a talk storage and processing circuitry. The talk storage is configured to store talk information in association with first user identification information, the talk information including a message from a second user to a first user, the first user identification information identifying the first user. The processing circuitry is configured to, based on an acquisition of one or more registered messages, output specification information that specifies the one or more registered messages, based on each of one or more first requests that is accompanied by the first user identification information and first specification information that is included in the specification information, add a first registered message specified by the first specification information, from among the one or more registered messages, to the talk storage, and based on each of one or more second requests that is accompanied by the first user identification information and second specification information that is included in the specification information, add a second registered message specified by the second specification information, from among the one or more registered messages, to the talk storage.

In an example embodiment of the present disclosure, there is provided a non-transitory computer-readable record medium storing instructions thereon, which when executed by an information processing device for providing a messaging service, causes the information processing device to implement an information processing method, which includes storing, in a talk storage of the information processing device, talk information in association with first user identification information, the talk information including a message from a second user to a first user, the first user identification information identifying the first user, based on an acquisition of one or more registered messages, outputting specification information that specifies the one or more registered messages, based on each of one or more first requests that is accompanied by the first user identification information and first specification information that is included in the specification information, adding a first registered message specified by the first specification information, from among the one or more registered messages, to the talk storage, and based on each of one or more second requests that is accompanied by the first user identification information and second specification information that is included in the specification information, adding a second registered message specified by the second specification information, from among the one or more registered messages, to the talk storage.

In an example embodiment of the present disclosure, a terminal configured to perform processing related to a messaging service includes a talk storage and processing circuitry. The talk storage is configured to store talk information in association with first user identification information, the talk information including a message from a second user to a first user, the first user being a user of the terminal, the first user identification information identifying the first user. The processing circuitry is configured to acquire specification information to specify one or more registered messages that are specified by the specification information, based on each of one or more first requests that is accompanied by the first user identification information and first specification information that is included in the specification information, add a first registered message specified by the first specification information, from among the one or more registered messages, to the talk storage, and based on each of one or more second requests that is accompanied by the first user identification information and second specification information that is included in the specification information, add a second registered message specified by the second specification information, from among the one or more registered messages, to the talk storage.

In an example embodiment of the present disclosure, there is provided a non-transitory computer-readable record medium storing instructions thereon, which when executed by processing circuitry, to cause a terminal to implement an information processing method, which includes storing, in a talk storage of the terminal, talk information in association with first user identification information, the talk information including a message from a second user to a first user that is a user of the terminal, the first user identification information identifying the first user, acquire specification information to specify one or more registered messages that are specified by the specification information, based on each of one or more first requests that is accompanied by the first user identification information and first specification information that is included in the specification information, add a first registered message specified by the first specification information, from among the one or more registered messages, to the talk storage, and based on each of one or more second requests that is accompanied by the first user identification information and second specification information that is included in the specification information, add a second registered message specified by the second specification information, from among the one or more registered messages, to the talk storage.

BRIEF DESCRIPTION OF DRAWINGS

FIG. 4 is a diagram showing an example of user registered data according to the first example embodiment.

FIG. 5 is a diagram showing an example of OA operator registered data according to the first example embodiment.

FIG. 6 is a diagram showing an example of friend management data according to the first example embodiment.

FIG. 7 is a diagram showing an example of an OA operator-specific registered message management database according to an example embodiment.

FIG. 17 is a diagram showing an example of registered message management data according to a second example embodiment.

FIG. 18 is a diagram showing an example of registered message management data according to a third example embodiment.

FIG. 21 is a diagram showing an example of registered message management data according to a first modification of the third example embodiment.

FIG. 22 is a diagram showing an example of registered message management data according to a fourth example embodiment.

FIG. 23 is a diagram showing examples of screens that are to be displayed on a display of a terminal according to the fourth example embodiment.

FIG. 24 is a diagram showing examples of screens that are to be displayed on the display of the terminal according to the fourth example embodiment.

FIG. 26 is a diagram showing an example of access history data according to a fifth example embodiment.

FIG. 27 is a diagram showing an example of official account-specific aggregated data according to the fifth example embodiment.

DETAILED DESCRIPTION

Compliance with Legal Requirements

It should be noted that the disclosure provided herein is premised on compliance with legal requirements such as secrecy of communication in a country in which the present disclosure is to be implemented.

Some example embodiments for implementing a system and the like according to the present disclosure will be described with reference to the drawings.

System Configuration

Figure 1:
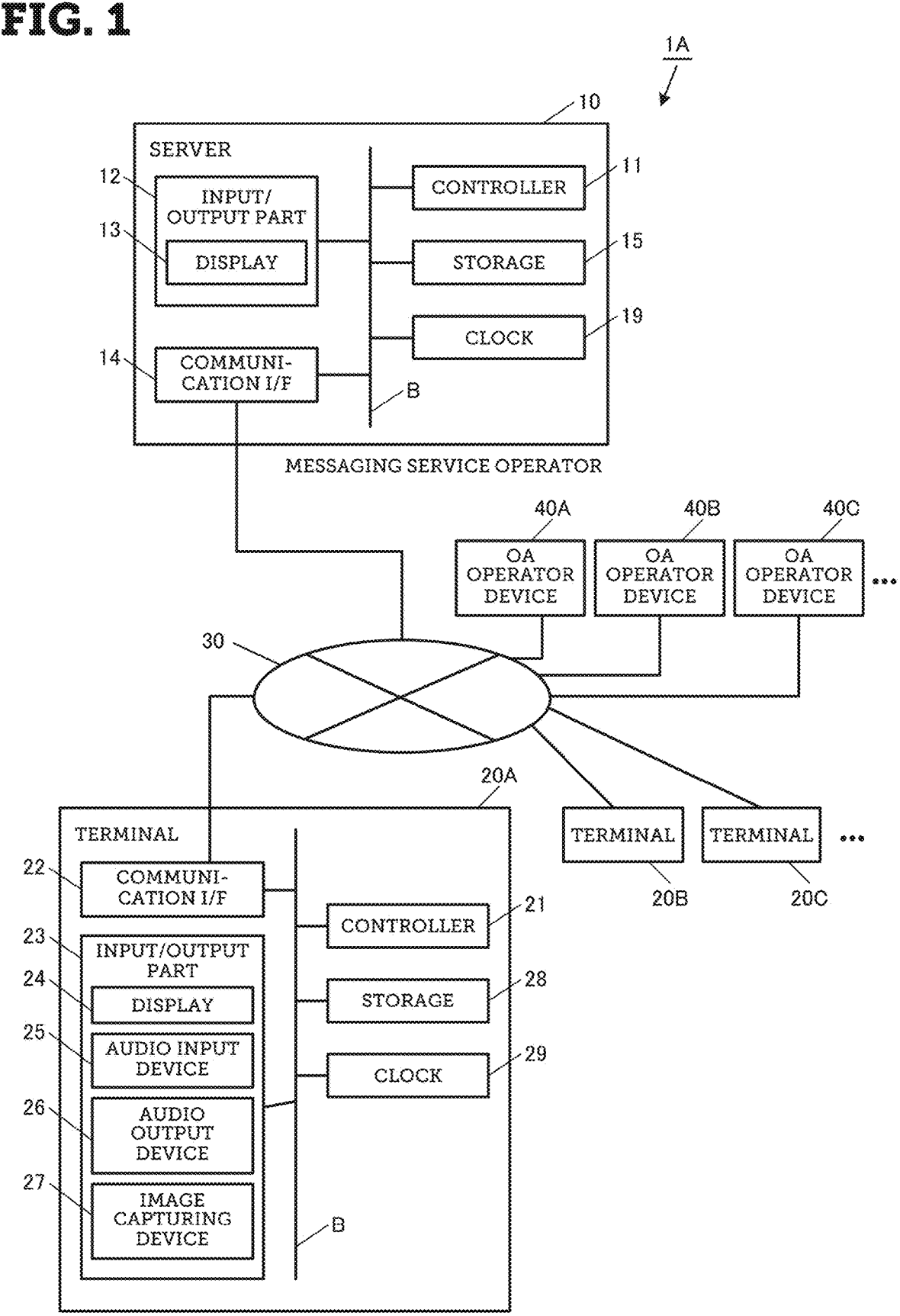
FIG. 1 is a diagram showing an example of a system configuration of a communication system according to an example embodiment.

FIG. 1 is a diagram showing an example of a system configuration of a communication system 1A according to an example embodiment of the present disclosure.

In the communication system 1A, a server 10, a plurality of terminals 20 (terminals 20A, 20B, 20C, . . . ), and a plurality of OA operator devices 40 (OA operator devices 40A, 40B, 40C, . . . ) are connected to each other via a network 30, in a non-limiting example.

The server 10 has the function of providing the terminals 20 (the users of the terminals 20) and the OA operator devices 40 (the OA operators) with a messaging service via the network 30, in a non-limiting example. The server 10 may also be referred to as "a messaging server" or the like.

The network 30 serves to connect one or more terminals 20, one or more servers 10, and one or more OA operator devices 40 to each other. That is, the network 30 serves as a communication network that provides a connection path to enable the various types of devices described above to transmit and receive data after the devices are connected to each other.

Note that the number of devices connected to the network 30 is not limited.

One or more portions of the network 30 may optionally be a wired network or a wireless network. Non-limiting examples of the network 30 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of a public switched telephone network (PSTN), a mobile phone network, integrated service digital networks (ISDNs), a radio LAN, long term evolution (LTE), code division multiple access (CDMA), Bluetooth (registered trademark), satellite communication, and a combination of two or more of these networks. The network 30 may be constituted by a single network 30 or a plurality of networks 30.

Each of the terminals 20 (terminals 20A, 20B, 20C, . . . ) may be any information processing terminal that is capable of implementing functions described in some example embodiments. Non-limiting examples of the terminals 20 include a smartphone, a mobile phone (e.g., a feature phone), a computer (non-limiting examples of which include a desktop, a laptop, and a tablet), a media computer platform (non-limiting examples of which include cable and satellite set-top boxes and a digital video recorder), a handheld computer device (non-limiting examples of which include a personal digital assistant (PDA) and an electronic mail client), a wearable terminal (an eyeglasses-type device, a watch-type device, etc.), and other types of computers and communication platforms. The terminals 20 may also be referred to as "information processing terminals".

The configurations of the terminals 20A, 20B, and 20C are essentially the same. A terminal that is used by a user X will be referred to as a "terminal 20X", and user information that is associated with the user X or the terminal 20X in a desired (or alternatively, predetermined) service will be referred to as "user information X", as necessary.

The user information is information regarding a user associated with an account that is used by the user in the desired (or alternatively, predetermined) service. Non-limiting examples of the user information include information that is input by the user or is assigned by the desired (or alternatively, predetermined) service, and is associated with the user, such as the user's name, an icon image of the user, the user's age, the user's sex, the user's address, the user's hobbies/preferences, and the user's identifier, and the user information may optionally be any one of or a combination of two or more of these pieces of information.

The server 10 may be any information processing device that is capable of implementing functions described in some example embodiments. Non-limiting examples of the server 10 include a server device, a computer (non-limiting examples of which include a desktop, a laptop, and a tablet), a media computer platform (non-limiting examples of which include cable and satellite set-top boxes and a digital video recorder), a handheld computer device (non-limiting examples of which include a PDA and an electronic mail client), and other types of computers and communication platforms. The server 10 may also be referred to as an "information processing terminal". If there is no need to distinguish the server 10 and the terminals 20, each of the server 10 and the terminals 20 may optionally be referred to as an "information processing device".

Hardware (HW) Configurations of Devices

The HW configurations of the devices included in the communication system 1A will be described.

(1) HW Configurations of Terminals

FIG. 1 shows an example of the HW configuration of each terminal 20.

Each terminal 20 includes a controller 21 (e.g., central processing unit: CPU), a storage 28, a communication interface (I/F) 22, an input/output part 23, and a clock 29. The HW constituent elements of each terminal 20 are connected to each other via a bus B, in a non-limiting example. Note that the HW configuration of each terminal 20 does not necessarily have to include all of the constituent elements. Each terminal 20 may optionally be configured such that one or more constituent elements are removable, in a non-limiting example.

The communication I/F 22 transmits and receives various types of data via the network 30. Communication may be carried out in a wired or wireless manner, and may be based on any communication protocol that enables mutual communication to be carried out. The communication I/F 22 functions to communicate with various types of devices such as the server 10 via the network 30. The communication I/F 22 transmits various types of data to various types of devices such as the server 10 in accordance with instructions from the controller 21. Further, the communication I/F 22 receives various types of data transmitted from various types of devices such as the server 10 and conveys the data to the controller 21. The communication I/F 22 may also be simply referred to as a "communication part". The communication I/F 22 may also be referred to as a "communication circuit" in cases where the communication I/F is constituted by a physically structured circuit.

The input/output part 23 includes a device that inputs various operations made to the terminal 20 and a device that outputs a result of processing performed by the terminal 20. The input/output part 23 may optionally be constituted by a single part into which an input device and an output device are integrated, or an input device and an output device that are separate from each other.

The input device is implemented by any one of or a combination of two or more of all types of devices capable of accepting input from a user and conveying information regarding the input to the controller 21. Non-limiting examples of the input device include a touch panel, a touch display, hardware keys of a keyboard or the like, a pointing device such as a mouse, a camera (which receives inputs of operations via moving images), and a microphone (which receives inputs of operations using voice).

The output device is implemented by any one of or a combination of two or more of all types of devices capable of outputting a result of processing performed by the controller 21. Non-limiting examples of the output device include a touch panel, a touch display, a speaker (which generates an audio output), a lens (which generates a three-dimensional (3D) output or a hologram output), and a printer.

In one example embodiment, the input/output part 23 includes a display 24, an audio input device 25, an audio output device 26, and an image capturing device 27, in a non-limiting example.

The display 24 is implemented by any one of or a combination of two or more of all types of devices capable of providing display in accordance with display data written in a frame buffer. Non-limiting examples of the display 24 include a touch panel, a touch display, a monitor (non-limiting examples of which include a liquid crystal display and an organic electroluminescence display (OELD)), a head mounted display (HMD), and devices capable of displaying images, text information, and the like using projection mapping or holograms, or in the air (may optionally be a vacuum). Note that the display 24 may optionally be capable of displaying display data in 3D.

If the input/output part 23 is a touch panel, the input/output part 23 and the display 24 may have substantially the same size and shape and be arranged opposing each other.

The audio input device 25 is used to input audio data (e.g., speech data). The same applies hereinafter. The audio input device 25 includes a microphone and so on.

The audio output device 26 is used to output audio data. The audio output device 26 includes a speaker and so on.

The image capturing device 27 is used to acquire moving image data. The image capturing device 27 includes a camera and so on.

The clock 29 is a built-in clock of the terminal 20 and outputs time information (e.g., time measurement information). The clock 29 includes a clock that employs a crystal oscillator or the like, in a non-limiting example. The clock 29 may also be referred to as a "time measurement device" or a "time information detecting device", in a non-limiting example.

Note that the clock 29 may optionally include a clock to which Network Identity and Time Zone (NITZ) standards or the like are applied.

The controller 21 includes a physically structured circuit for executing functions that are implemented in accordance with codes or commands included in a program, and is implemented by a data processing device embedded in hardware, in a non-limiting example. Accordingly, the controller 21 may optionally be referred to as a "control circuit" or "control circuitry".

Non-limiting examples of the controller 21 include a central processing unit (CPU), a microprocessor, a processor core, a multiprocessor, an Application-Specific Integrated Circuit (ASIC), and a Field Programmable Gate Array (FPGA).

The storage 28 functions to store various programs and various types of data that are necessary for the terminal 20 to operate. Non-limiting examples of the storage 28 include various storage media such as an Hard Disk Drive (HDD), a Solid State Drive (SSD), a flash memory, a Random Access Memory (RAM), and a Read Only Memory (ROM). The storage 28 may optionally be referred to as a "memory".

The terminal 20 stores a program P in the storage 28, and functional units included in the controller 21 of the terminal 20 execute respective processings of the program P. That is, the program P stored in the storage 28 causes the terminal 20 to implement the functions executed by the controller 21. The program P may optionally be referred to as a "program module".

(2) HW Configuration of Server

FIG. 1 shows an example of the HW configurations of the server 10.

The server 10 includes a controller (e.g., CPU) 11, a storage 15, a communication I/F (interface) 14, an input/output part 12, and a clock 19. The HW constituent elements of the server 10 are connected to each other via the bus B, in a non-limiting example. Note that the HW configuration of the server 10 does not necessarily have to include all of the constituent elements. The HW of the server 10 may optionally be configured such that the display 13 is removable, in a non-limiting example.

The controller 11 includes a physically structured circuit for executing functions that are implemented in accordance with codes or commands included in a program, and is implemented by a data processing device embedded in hardware, in a non-limiting example.

The controller 11 may be a central processing unit (CPU), or may optionally be a microprocessor, a processor core, a multiprocessor, an ASIC, or a FPGA. In the present disclosure, the controller 11 is not limited to these examples.

The storage 15 functions to store various programs and various types of data that are necessary for the server 10 to operate. The storage 15 is implemented by various storage media such as an HDD, an SSD, and a flash memory. However, in the present disclosure, the storage 15 is not limited to these examples. The storage 15 may optionally be referred to as a "memory".

The communication I/F 14 transmits and receives various types of data via the network 30. Communication may be carried out in a wired or wireless manner, and may be based on any communication protocol that enables mutual communication to be carried out. The communication I/F 14 functions to communicate with various types of devices such as the terminals 20 via the network 30. The communication I/F 14 transmits various types of data to various types of devices such as the terminals 20 in accordance with instructions from the controller 11. Further, the communication I/F 14 receives various types of data transmitted from various types of devices such as the terminals 20 and conveys the data to the controller 11. The communication I/F 14 may also simply be referred to as a "communication part". The communication I/F 14 may also be referred to as a "communication circuit" in cases where the communication I/F is constituted by a physically structured circuit.

The input/output part 12 includes a device that inputs various operations made to the server 10 and a device that outputs a result of processing performed by the server 10. The input/output part 12 may optionally be constituted by an input device and an output device that are configured as a single device or are separate from each other.

The input device is implemented by any one of or a combination of two or more of all types of devices capable of accepting input from a user and conveying information regarding the input to the controller 11. The input device is implemented by hardware keys, a typical example of which is a keyboard, and a pointing device such as a mouse. Note that the input device may optionally include a touch panel, a camera (which receives inputs of operations via moving images), or a microphone (which receives inputs of operations using voice), in a non-limiting example.

The output device is implemented by any one of or a combination of two or more of all types of devices capable of outputting a result of processing performed by the controller 11. Non-limiting examples of the output device include a touch panel, a touch display, a speaker (which generates audio output), a lens (which generates a three-dimensional (3D) output or a hologram output), and a printer.

In one embodiment, the input/output part 12 includes a display 13, in a non-limiting example.

The display 13 is typically implemented by a monitor (non-limiting examples of which include a liquid crystal display and an organic electroluminescence display (OELD)). Note that the display 13 may optionally be a head mounted display (HMD) or the like. Note that the display 13 may optionally be capable of displaying display data in 3D. In the present disclosure, the display 13 is not limited to these examples.

The clock 19 is a built-in clock of the server 10 and outputs time information (e.g., time measurement information). The clock 19 include a Real Time Clock (RTC) as a hardware clock, a system clock, and the like, in a non-limiting example. The clock 19 may also be referred to as a "time measurement device" or a "time information detecting device", in a non-limiting example.

In the present description, the operator that provides a messaging service (e.g., the operator that uses and manages the server 10) is referred to as a "messaging service operator", and an information processing device for providing a messaging service using a messaging application (e.g., an information processing device that manages information regarding a messaging service) is described as the server 10.

(3) HW Configuration of OA Operator Device

Each OA operator device 40 is a device that is used and managed by an official account operator (hereinafter referred to as an "OA operator" as appropriate), which is an operator that has an official account (hereinafter referred to as an "OA" as appropriate) in a messaging service (a messaging application). Each OA operator device 40 is implemented by a server, a personal computer, a terminal (non-limiting examples of which include a mobile terminal), or the like, in a non-limiting example.

Because the HW configuration of each OA operator device 40 can be implemented in the same manner as that of the server 10 and the terminals 20, the illustration and description thereof will be omitted.

Non-limiting examples of the OA operators include operators in various business formats, for example, convenience stores, supermarkets, fast food stores, restaurants, pharmacies, and department stores.

The OA operators are examples of operators in the present disclosure.

(4) Others

The server 10 stores the program P in the storage 15, and functional units included in the controller 11 of the server 10 execute respective processings of the program P. That is, the program P stored in the storage 15 causes the server 10 to implement the functions executed by the controller 11. The program P may optionally be referred to as a "program module".

Some example embodiments of the present disclosure will be described assuming that the example embodiments are implemented as a result of CPU(s) of the terminals 20 and/or the server 10 executing the program P.

Note that the controller 21 of each terminal 20 and/or the controller 11 of the server 10 may optionally implement processing by using not only the CPU(s) including a control circuit, but also a logic circuit (hardware) or a dedicated circuit that is formed on an integrated circuit (IC) chip, a Large Scale Integration (LSI), or the like. Further, these circuits may optionally be implemented by one or more integrated circuits, and a plurality of types of processing described in some example embodiments may optionally be implemented by a single integrated circuit. LSI may be referred to as VLSI, super LSI, ultra LSI, or the like depending on the degree of integration. Accordingly, the controller 21 may optionally be referred to as a "control circuit" or "control circuitry".

The program P (non-limiting examples of which include a software program, a computer program, and a program module) in some example embodiments of the present disclosure may optionally be provided in a state where the program is stored in a non-transitory computer-readable storage medium. The program P can be stored in a "non-transitory tangible computer-readable medium". Further, the program P may optionally be a program for implementing some of the functions described in some example embodiments of the present disclosure. Furthermore, the program P may optionally be a differential file (differential program) that is configured to implement the functions described in some example embodiments of the present disclosure in combination with a program P that is already recorded in a storage medium.

The storage medium may include one or more semiconductor-based or other integrated circuits (ICs, non-limiting examples of which include field programmable gate arrays (FPGAs) and application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM drives, secure digital cards, drives, any other appropriate storage media, and a suitable combination of two or more of these storage media. Where appropriate, the storage medium may consist only of a volatile storage medium or a non-volatile storage medium, or a combination of volatile and non-volatile storage media. Note that the storage medium is not limited to these examples, and may be any device or medium that is capable of storing the program P. Further, the storage medium may optionally be referred to as a "memory".

The server 10 and/or the terminals 20 can implement functions of a plurality of functional devices (e.g., functional units or modules) described in some example embodiments by reading the program P stored in the storage medium and executing the read program P.

The program P according to some example embodiments of the present disclosure may optionally be provided to the server 10 and/or the terminals 20 via any transmission medium (a communication network, broadcast waves, etc.) that is capable of transmitting the program. The server 10 and/or the terminals 20 implement(s) the functions of the functional devices (e.g., functional units or modules) described in some example embodiments by executing the program P downloaded via the Internet or the like, in a non-limiting example.

Some example embodiments of the present disclosure can also be implemented in the form of a data signal in which the program P is embodied through electronic transmission.

At least a portion of processing executed in the server 10 and/or the terminals 20 may optionally be implemented through cloud computing constituted by one or more computers.

At least a portion of processing executed in the terminals 20 may optionally be carried out by the server 10. In this case, the server 10 may optionally carry out at least a portion of processing carried out by functional devices (e.g., functional units or modules) of the controller 21 of each terminal 20.

At least a portion of processing executed in the server 10 may optionally be carried out by the terminals 20. In this case, the terminals 20 may optionally carry out at least a portion of processing carried out by functional devices (e.g., functional units or modules) of the controller 11 of the server 10.

In some example embodiments of the present disclosure, configurations for determination are not be included unless explicitly mentioned otherwise, and desired (or alternatively, predetermined) processing may be activated when a determination condition is satisfied, or desired (or alternatively, predetermined) processing may be activated when a determination condition is not satisfied, without limitation thereto.

The program according to some example embodiments of the present disclosure is implemented using a script language such as ActionScript or JavaScript (registered trademark), a compiler language such as Objective-C or Java (registered trademark), or a markup language such as HTML5, for example, although there is no limitation thereto.

In some example embodiments of the present specification, the expression "by means of a communication I/F" is used as appropriate. This expression means that a device transmits and receives various types of information and data via the communication I/F (via a communication part) based on control performed by a controller (a processor, etc.), in a non-limiting example.

First Example Embodiment

There is a technique for performing control (to activate a specific application, or a cause an application to perform specific processing, in a non-limiting example) based on specification information (non-limiting examples of which include a URL) in a terminal 20 operated (designated) by the user. However, this technique is unsatisfactory in terms of user convenience because uniform processing and control are performed even if the users' purposes and motives are different.

In some example embodiments described below, a messaging service will be taken as an example. According to some example embodiments, processing and control may be performed according to the purpose and motive of each user, as described below.

The first example embodiment is an example embodiment in which the server 10 adds a message acquired from an OA operator device 40 to a talk room for the account of the user of a terminal 20 and the account of the OA operator, or updates such a message, based on a request accompanied with specification information, received from the terminal 20.

The descriptions in the first example embodiment are applicable to any of the other example embodiments and other modifications.

The following example embodiments describe the messaging service as an instant messaging service (IMS) for sending and receiving simple messages between a plurality of devices via the server 10. The application for implementing this messaging service is referred to as a "messaging application", and is illustrated and described as "Messaging App" as appropriate.

Each message may include, in addition to simple text, various pieces of information that can be transmitted and received between devices, such as image information (including pictograms, still images, moving image information, or the like), operable information (including buttons, icons, or the like), specification information, communication information, and link information (URLs, URIs, or the like), in a non-limiting example.

Although information that is transmitted and received in a messaging service is referred to as a "message", such information may be expressed as "content" in a broader sense.

Further, in this case, in a non-limiting example, a text format message and the above-mentioned various types of information (image information, operable information, specification information, and so on) may be distinguished from each other, and such various types of information may be collectively referred to as "content".

Further, in the present description, the user of a terminal 20 using the messaging service (messaging application) is referred to as a "general user", and the account of this general user is referred to as a "general account".

In contrast, the user of an OA operator device 40 using the messaging service is referred to as an "OA operator", and the account of this OA operator is referred to as an "official account".

That is, in the present description, accounts for the messaging service include general accounts and official accounts.

The OA operator devices 40 of OA operators that have their own official accounts are also capable of sending and receiving messages to and from other devices via the server 10 in the same way as terminals 20 that have their own general accounts. In a non-limiting example, messages sent from the terminal 20 of a user that has a general account to an OA operator device 40 may be sent to the OA operator device 40 via the server 10, as in the case where messages are sent to another terminal 20. Then, the history of the messages is displayed on the display (not shown) of the OA operator device 40 as a talk room or the like.

Further, in the following example embodiments, "URL (Uniform Resource Locator)" will be described as an example of specification information.

URL is a type of data format for describing the location (address) of information (information resources) that is present on the network 30 represented by the Internet, and is generally a type of "URI (Uniform Resource Identifier)".

The messaging service: MS (including IMS) can also be regarded as a form (one form) of social networking services (SNSs) (alternatively referred to as social media services). Therefore, the messaging service and the social networking services may be or may not be distinguished from each other. For example, the messaging service may optionally be regarded as being included in social networking services.

Functional Configuration (1) Server

Figure 2:
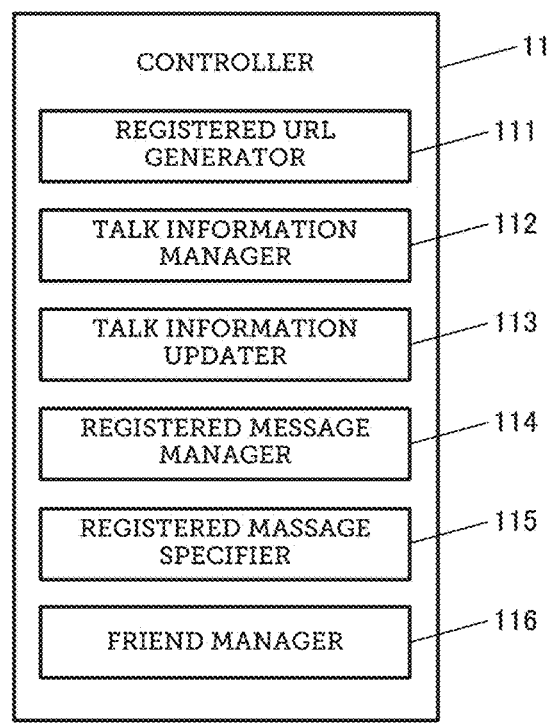
FIG. 2 is a diagram showing examples of functions implemented by a controller included in a server according to a first example embodiment.

FIG. 2 is a diagram showing examples of functions implemented by the controller 11 included in the server 10 in a first example embodiment.

The controller 11 includes a registered URL generator 111, a talk information manager 112, a talk information updater 113, a registered message manager 114, a registered message specifier 115, and a friend manager 116 as functional units or elements, in a non-limiting example.

The registered URL generator 111 acquires a message that the OA operator is to deliver using the official account (OA) (e.g., a message that is to be added to the talk room for the account of the user of a terminal 20 and the official account of the OA operator). In this case, the method for acquiring a message is not limited. In a non-limiting example, the registered URL generator 111 may receive and acquire a message transmitted from the OA operator device 40, or download and acquire a message uploaded to a desired (or alternatively, predetermined) location by the OA operator device 40. Thereafter, the registered URL generator 111 generates (issues), for each of the acquired messages, a URL (a unique URL) that is unique to the message.

The generation of such a URL can be regarded as an example of the output of specification information that specifies the registered message.

The talk information manager 112 manages talk information regarding talking between accounts (including general accounts and official accounts).

Talk information includes the content of a series of talks including messages exchanged between accounts (one-to-one talks, including group talks), and a history of exchanged messages (history of sending and receiving messages). A virtual room for displaying talk information, which is a kind of UI (user interface), is referred to as a "talk room".

In the following description, an expression "(to) add a message to the talk room" may be used, and this expression means the same as or substantially similar to updating talk information regarding the accounts corresponding thereto in a talk information management database 156 (e.g., a talk storage) by adding a message thereto. Therefore, a talk room may also be regarded as a kind of talk information.

The talk information updater 113 updates the talk information stored and managed in the talk information management database 156, based on the official accounts and the registered messages specified by the registered message specifier 115.

The registered message manager 114 stores, for each official account, the URLs generated by the registered URL generator 111 and the messages acquired from the OA operator device 40, in an OA operator-specific registered message management database 155 in association with each other, and manages such pieces of information.

The URLs and the messages to be stored in the OA operator-specific registered message management database 155 are referred to as "registered URLs" and "registered messages," respectively.

In the present example embodiment, each registered URL serves as information used by a terminal 20 to request that the server 10 add the registered message associated with the registered URL to the talk room for the account of the user of the terminal 20 and the official account of the OA operator. This request is referred to as a "request to add a registered message".

The registered message specifier 115 specifies, based on a request to add a registered message accompanied by a registered URL, the official account and the registered messages stored in the OA operator-specific registered message management database 155 in association with the registered URL.

The friend manager 116 manages friend relationships between a plurality of accounts (including general account and official accounts).

Figure 3:
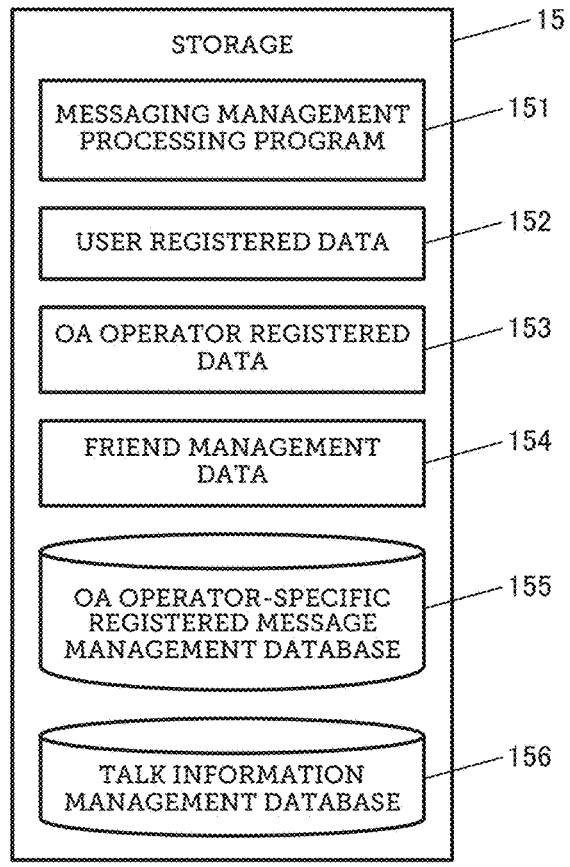
FIG. 3 is a diagram showing examples of pieces of information stored in a storage included in the server according to the first example embodiment.

FIG. 3 is a diagram showing examples of pieces of information stored in the storage 15 included in the server 10 in the first example embodiment.

In a non-limiting example, the storage 15 stores a messaging management processing program 151, which is to be executed by the controller 11 to perform messaging management processing, user registered data 152, OA operator registered data 153, friend management data 154, an OA operator-specific registered message management database 155, and the talk information management database 156.

The user registered data 152 is registered data regarding the terminal 20 that uses the messaging application, or data regarding the user of the terminal 20, and FIG. 4 shows an example of the data structure thereof.

In a non-limiting example, the user registered data 152 stores user names, application IDs, contact information, attribute information, and other registered information in association with each other.

Each user name is the name of the user of a terminal 20 that uses the messaging application, and stores the name that is registered when the user of the terminal 20 uses the messaging application, in a non-limiting example.

Each application ID is information that is used to identify the account for the messaging application corresponding to the user has associated with the user name, or the account itself. For example, such an application ID is a unique value for the account corresponding thereto, and the unique value to be stored is set by the server 10, in a non-limiting example.

In a non-limiting example, the user of a terminal 20 may also be referred to as a "general user". The application IDs to be registered in the user registered data 152 correspond to the accounts of general users, and such accounts may be referred to as "general accounts".

Contact information is contact information regarding the user is associated with the user name, and contains pieces of information such as the telephone number of the user (a mobile number in a non-limiting example) and an e-mail address (a terminal e-mail address in a non-limiting example), and the like, in a non-limiting example.

Attribute information is information regarding the attributes of the user associated with the user name, and includes sex, age, occupation (occupation type), and the like, in a non-limiting example.

Other registered information may contain authentication information such as passwords (including a login password, an authentication password, and so on) used for various authentications in the messaging application of the user has associated with the user name, image data of the icon used by the user (an icon image), the profile of the user (a user profile), and the like, in a non-limiting example.

The OA operator registered data 153 is registered data regarding the OA operator device 40 that uses the messaging application, or the OA operator, and an example of the data structure thereof is shown in FIG. 5.

In a non-limiting example, the OA operator registered data 153 stores operator names, application IDs, operator contact information, official account names, and other registered information in association with each other.

Each operator name is the name of an OA operator that uses the messaging application, and stores the name that is registered when the OA operator uses the messaging application, in a non-limiting example.

Each application ID is information that is used to identify the account for the messaging application of the OA operator corresponding to the operator name, or the account itself. For example, such an application ID is a unique value for the account corresponding thereto, and the unique value to be stored is set by the server 10, in a non-limiting example.

In a non-limiting example, the users (the OA operators) of the OA operator devices 40 may also be referred to as "official account users (OA users)". In addition, the application IDs registered in the OA operator registered data 153 indicate the accounts of the official account users, and therefore such application IDs may be referred to as "official accounts".

Operator contact information is contact information regarding the OA operator is associated with the operator name, and contains pieces of information such as the telephone number and the e-mail address of the OA operator, the IP address of the OA operator device 40, the URL of the homepage of the OA operator, and the like, in a non-limiting example.

Each official account name is the name of the official account registered by the operator corresponding thereto, in the messaging application.

Other registered information may contain the image data of the icon (an icon image) used by the OA operator is associated with the operator name, advertisement information, and the like, in a non-limiting example.

The present example embodiment illustrates and describes each OA operator assuming that each OA operator has registered one official account, but each OA operator may be allowed to register a plurality of official accounts.

Although the user registered data 152 and the OA operator registered data 153 in the present example embodiment are set as separate pieces of registered data to facilitate understanding, these pieces of data may be integrated into one piece of registered data and managed and stored on the server 10 side.

Further, regardless of whether the user registered data 152 and the OA operator registered data 153 are separate pieces of data or are integrated into one piece of data, information for distinguishing/discerning general accounts and official accounts, such as information indicating an account type in a non-limiting example, may be associated therewith.

Further, it is possible to distinguish/discern general accounts and official accounts by making the ID systems different from each other.

The friend management data 154 is data used to manage friends in the messaging application, and an example of the data structure thereof is shown in FIG. 6.

In a non-limiting example, the friend management data 154 stores application IDs, the application IDs of friends, and the user names of the friends, in association with each other.

A friend means a relationship that needs registration in the messaging application (messaging service) in the present description to send and receive messages (both bidirectional and unidirectional).

Registering a friend can be regarded as associating a plurality of accounts (application IDs) with each other.

In the example shown in this figure, "ac0003", "ac0020", "ac030", . . . are registered as the application IDs of the friends of the user associated with the application ID "ac0001".

The application ID "ac0003" is a general account, and the user name of this friend is "Z.Z".

The application ID "ac0020" is an official account, and the user name of this friend is "Shop A".

The application ID "ac0030" is an official account, and the user name of this friend is "Shop B".

The OA operator-specific registered message management database 155 is a database for managing the correspondence between the registered URLs and the registered messages for each OA operator, and an example of the data structure thereof is shown in FIG. 7.

The OA operator-specific registered message management database 155 contains OA operator-specific registered message management data that is data of each OA operator.

Each piece of OA operator-specific registered message management data contains the application ID of an OA operator and registered message management data, in a non-limiting example.

Registered message management data is data used to manage registered messages of the official accounts owned by the OA operator associated with this application ID, and registered URLs, texts, and attached images are stored in association with the official account name, in a non-limiting example.

In this example, text and an attached image associated with each registered URL constitute a registered message.

The text constitutes the registered message associated with this registered URL in a text format.

The attached image constitutes the registered message associated with this registered URL in an image format.

In this example, as registered messages (texts and/or attached images), registered messages, with which pieces of coupon information (which may also be simply referred to as "coupons") that can be acquired by terminals 20 as discount tickets (discount coupons) and can be used at the stores of the OA operator are associated, are stored. Coupon information is an example of service information regarding services provided by the OA operator. Coupon information may also be regarded as an example of information regarding benefits.

In this diagram, the foremost dataset in the OA operator-specific registered message management database 155 shows the piece of OA operator-specific registered message management data of the OA operator that has the application ID "ac0020" (=Shop A).

Stored in this piece of OA operator-specific registered message management data is, together with the official account name ("Shop A" in this example), registered message management data that contains registered messages with which coupons for products sold by the shop A are associated, in a non-limiting example.

A non-limiting example of the shop A is a convenience store.

For the first registered URL, the text data saying "20% OFF ALL SPORTS DRINKS", which is text, and image data indicated by "https://coupon1/img11111xxx.jpg", which is an attached image, are stored in association with each other.

For the second registered URL, the text data saying "TRY OUR NEW FINEST ROASTED COFFEE AT HALF PRICE", which is text, and image data indicated by "https://coupon2/img22222xxx.jpg", which is an attached image, are stored in association with each other.

The controller 11 of the server 10 can display the content of the data stored and managed in the OA operator-specific registered message management database 155 on the display 13, in a non-limiting example. The display of such content is an example of the output of specification information that specifies a registered message. In this way, it is possible to enable the messaging service operator to grasp the correspondence between the registered URLs and the registered messages.

Further, in a non-limiting example, the controller 11 of the server 10 can transmit the registered message management data contained in the OA operator-specific registered message management database 155 to the OA operator device 40 of the OA operator corresponding thereto, using the communication I/F 14. The transmission of such content is an example of the output of specification information that specifies a registered message. In this way, it is possible to enable the OA operator to inform the users of the registered URLs associated with the OA operator's registered messages by posting the URLs on various kinds of SNSs, homepages, websites, web pages, newspapers, magazines, advertisements, and so on.

A page that can be accessed from the terminals 20 and on which a registered URL is posted is referred to as a "registered URL-posted page".

The talk information management database 156 is a database that stores, for each application ID, talk information (e.g., a talk history) including messages exchanged between users associated with the application IDs registered as friends in the friend management data 154.

(2) Terminals

Figure 8:
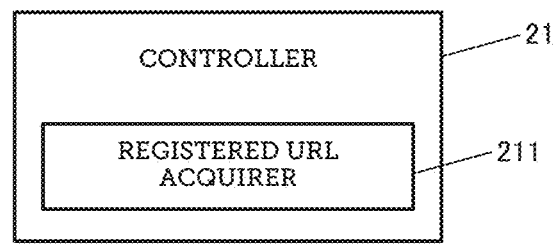
FIG. 8 is a diagram showing an example of functions implemented by a controller included in a terminal according to the first example embodiment.

FIG. 8 is a diagram showing examples of functions implemented by the controller 21 (or an example functional unit included in the controller 21) of each terminal 20 in the first example embodiment.

The controller 21 includes a registered URL acquirer 211 as a functional unit, in a non-limiting example.

In response to an operation made on a registered URL posted on a registered URL-posted page, the registered URL acquirer 211 acquires the registered URL. Further, the registered URL acquirer 211 requests that the server 10 add a registered message accompanied by the acquired registered URL, using the communication I/F 22.

Figure 9:
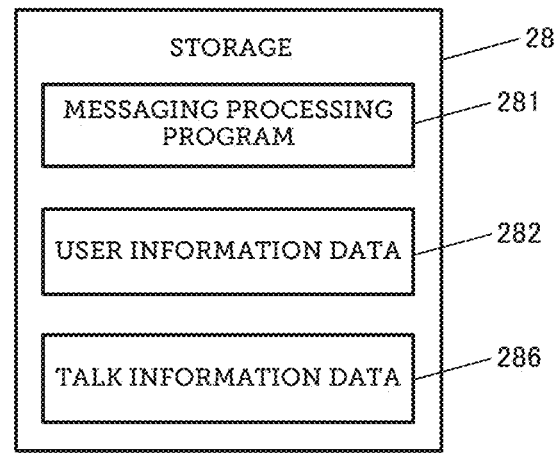
FIG. 9 is a diagram showing examples of pieces of information stored in a storage included in the terminal according to the first example embodiment.

FIG. 9 is a diagram showing examples of pieces of information stored in the storage 28 of each terminal 20 in the first example embodiment.

The storage 28 stores a messaging processing program 281 that is to be executed by the controller 21 to perform messaging processing, user information data 282, and talk information data 286, which are non-limiting examples.

The user information data 282 is data in which user information in the messaging application regarding the user of the terminal 20 is stored, and at least the application ID of the user of the terminal 20 is stored therein.

The talk information data 286 is data in which talk information (a talk history or the like) including messages exchanged between users associated with the application IDs registered as those of friends is stored for the application ID of the user of the terminal 20.

Display Screen

The following describes a non-limiting example in which the terminal 20 is a smartphone provided with a vertically elongated display 24.

In a smartphone, in a non-limiting example, a touch panel that functions as an input device is provided so as to face the display, thereby forming a touch screen. When an element such as an icon, a button, an item, or an input area is displayed on the display, if the area of the touch panel facing the area where the element is displayed is operated (e.g., touched or tapped) by the user, the program associated with the element or a subroutine of the program will be executed.

In the following images of the display screen, an example in which the official account name is "Shop A" as shown in the foremost dataset in the OA operator-specific registered message management database 155 (FIG. 7) is referenced to illustrate the flow of processing up to when a registered message is added to the official account.

Further, the following images of the display screen will be described assuming that the user of the terminal 20 is "User X.X" and the user X.X has already registered the official account of the shop A as a friend in the messaging application.

The transitions between display screens described below are only examples of transitions between display screens for realizing a method according to an example embodiment of the present disclosure. In the display screen transitioning as illustrated below, some of the display screens may be omitted or another display screen may be added.

Figure 10:
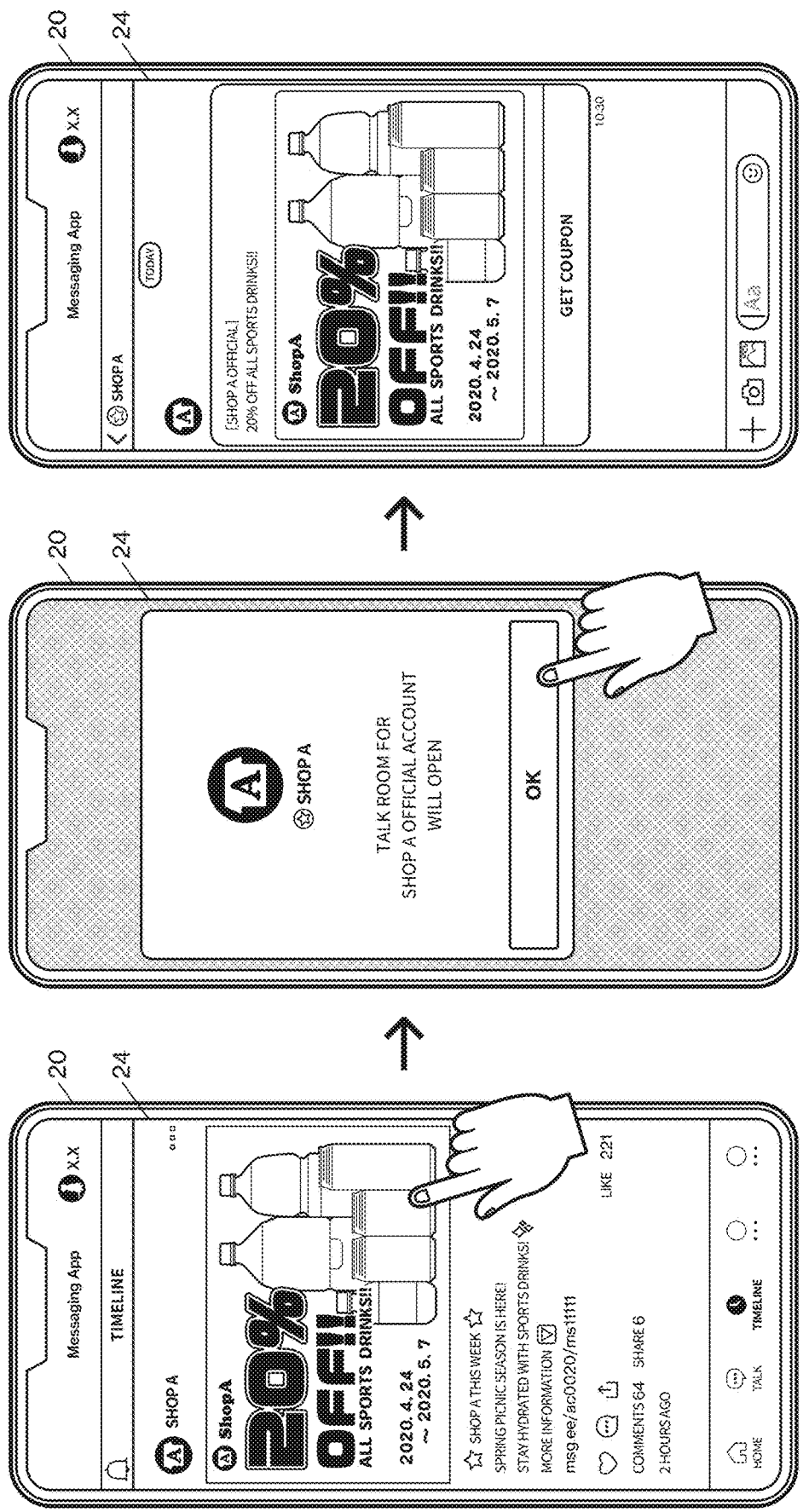
FIG. 10 is a diagram showing examples of screens that are to be displayed on a display of the terminal according to the first example embodiment.
Figure 11:
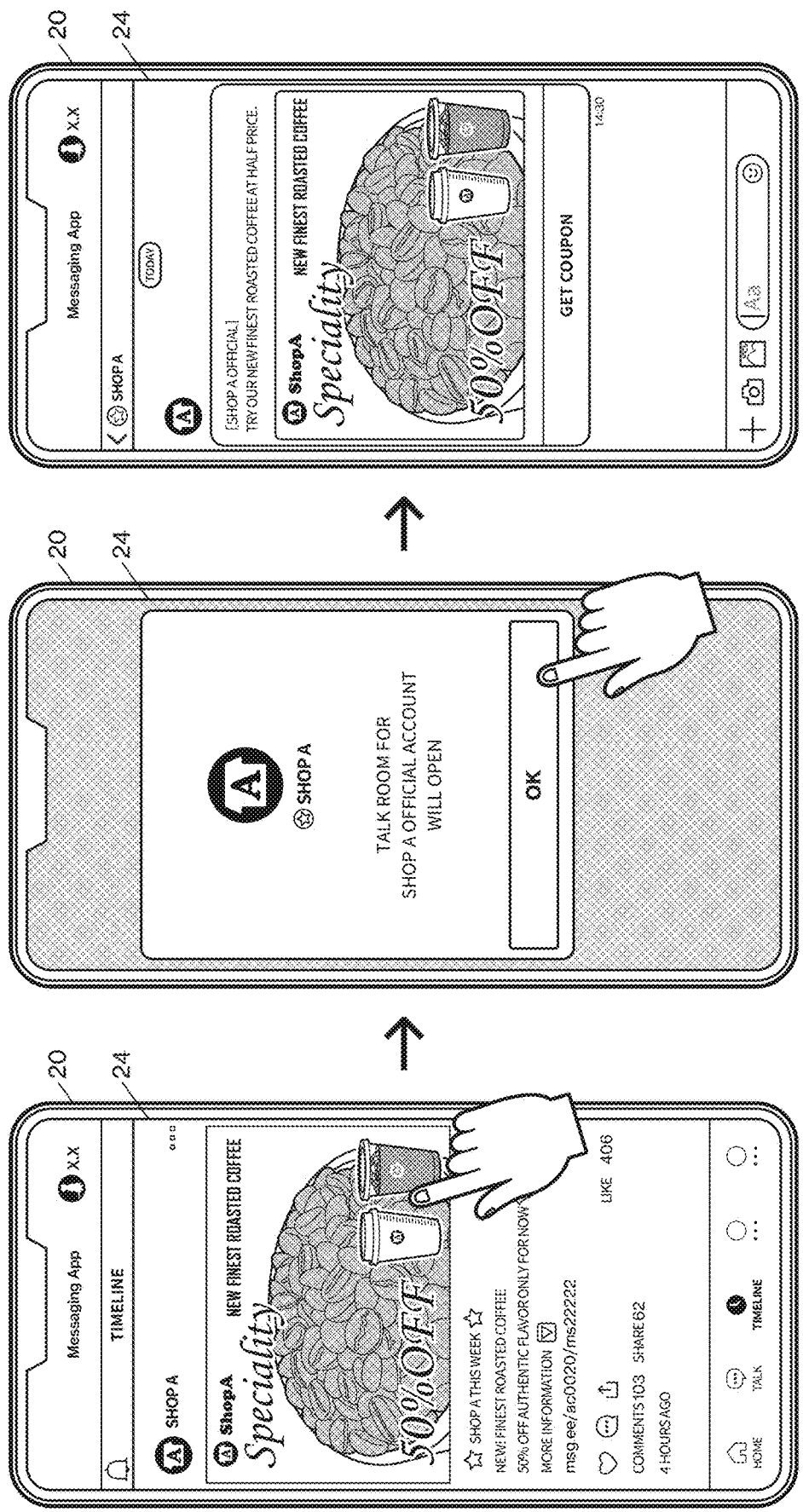
FIG. 11 is a diagram showing examples of screens that are to be displayed on the display of the terminal according to the first example embodiment.

FIGS. 10 and 11 are diagrams showing examples of screens that are to be displayed on the display 24 of the terminal 20 in the first example embodiment.

The left part of FIG. 10 shows a state in which a timeline screen, which is a screen for a timeline that is one function of the messaging application, is displayed in the state where the messaging application is running in the terminal 20 of the user X.X.

In a non-limiting example, the timeline of the messaging application is a function that is used by a user to share their recent news or events that the user wants to report, among accounts that have been registered as friends, using text and images (including still images and moving images).

In this timeline screen, a description, a registered URL, a banner image with a link that is based on the registered URL, and so on are displayed as information indicating that a user can receive the "20% OFF ALL SPORTS DRINKS" service if the user registers the official account of "Shop A" as a friend, which is information posted by a user who has been registered by the user X.X as a friend.

In a non-limiting example, when the user performs an operation (a non-limiting example of which is tapping) on the displayed registered URL or banner image, the terminal 20 requests that the server 10 add the registered message associated with the registered URL.

A non-limiting example of "tapping" is the action of a user lightly touching the display 24 (the touch screen) formed integrally with a touch panel, with a finger or a pen tip, and releasing the finger after touching the touch panel.

In this example, it is assumed that the terminal 20 has logged into the messaging application. Further, as described above, the user X.X has already registered the official account of the shop A as a friend.

In this case, in a non-limiting example, a registered message is transmitted from the server 10 to the terminal 20, and the screen shown in the middle part of FIG. 10 (a non-limiting example of which is a screen for asking the user whether or not to open a talk room for the official account of the shop A) is displayed through redirecting, and thereafter the talk room for the official account of the shop A as shown in the right part of FIG. 10 is displayed.

Note that the screen for asking the user whether or not to open a talk room for the official account of the shop A as shown in the middle part of FIG. 10 may be omitted.

In a non-limiting example, in the talk room for the official account, a symbol mark of the shop A, which indicates that the talk room is that of the official account of the shop A, and the text "Shop A" are displayed in the upper left strip area as information indicating the current position within the messaging application. Below the strip area, a talk area is formed for the user X.X and the shop A to talk interactively so that messages from the shop A are displayed on the left side in the screen, and messages from the user X.X are displayed on the right side in the screen.

In this example, the registered message associated with the above-described first registered URL is displayed as a message from the shop A on the left side in the screen. For example, letters "20% OFF ALL SPORTS DRINKS" are displayed as text, and a coupon image in which "20% OFF ALL SPORTS DRINKS" is illustrated is displayed as an attached image. Below the coupon image, a coupon acquisition button showing "GET COUPON" is displayed, so that the user can download and acquire the coupon by operating this coupon acquisition button.

It is possible to enable the server 10 to provide and distribute coupons. That is, the terminal 20 can be configured to download coupons from the server 10.

Example embodiments of the present disclosure are not limited in such a way, and the terminal 20 may optionally download coupons from the OA operator device 40.

As in FIG. 10, the left part of FIG. 11 shows a state in which a timeline screen for the messaging application is displayed. In this timeline screen, unlike in FIG. 10, a description, a registered URL, a banner image, and so on are displayed as information indicating that a user can receive the "NEW FINEST ROASTED COFFEE AT HALF PRICE (50% OFF)" service if the user registers the official account of "Shop A" as a friend.

In a non-limiting example, when the user performs an operation on the displayed registered URL or banner image, the terminal 20 requests that the server 10 add the registered message associated with the registered URL.

In this case, in a non-limiting example, as in FIG. 10, the screen shown in the middle part of FIG. 11 (a non-limiting example of which is a screen for asking the user whether or not to open a talk room for the official account of the shop A) is displayed, and thereafter the talk room for the official account of the shop A shown in the right part of FIG. 11 is displayed.

This talk room for the official account of the shop A is the same talk room as the talk room for the official account of the shop A shown in the right part of FIG. 10. That is, in the present example embodiment, the shop A has one official account registered in the server 10, and therefore the shop A has one type of talk room for the official account therefor.

Nevertheless, the registered message added to this talk room is different from the registered message added in the right part of FIG. 10.

For example, in this talk room, the registered message associated with the above-described second registered URL is displayed as a message from the shop A on the left side in the screen. Specifically, letters "TRY OUR NEW FINEST ROASTED COFFEE AT HALF PRICE (50% OFF)" are displayed as text, and a coupon image in which "FINEST ROASTED COFFEE AT HALF PRICE (50% OFF)" is illustrated is displayed as an attached image. Below the coupon image, a coupon acquisition button showing "GET COUPON" is displayed, so that the user can download and acquire the coupon by operating this coupon acquisition button.

Note that the page on which information such as the registered URLs are displayed is not limited to the timeline page in the messaging application as described above.

Although details will be described below, the page may be a page in an SNS application (alternatively referred to as a social media application) that is different from the messaging application, or a web page, website, home page, or the like that can be displayed using a web browser.

That is, information such as the registered URLs may be displayed at any place on the network 30 from which the information can be browsed by the user using the terminal 20.

Processing

Figure 12:
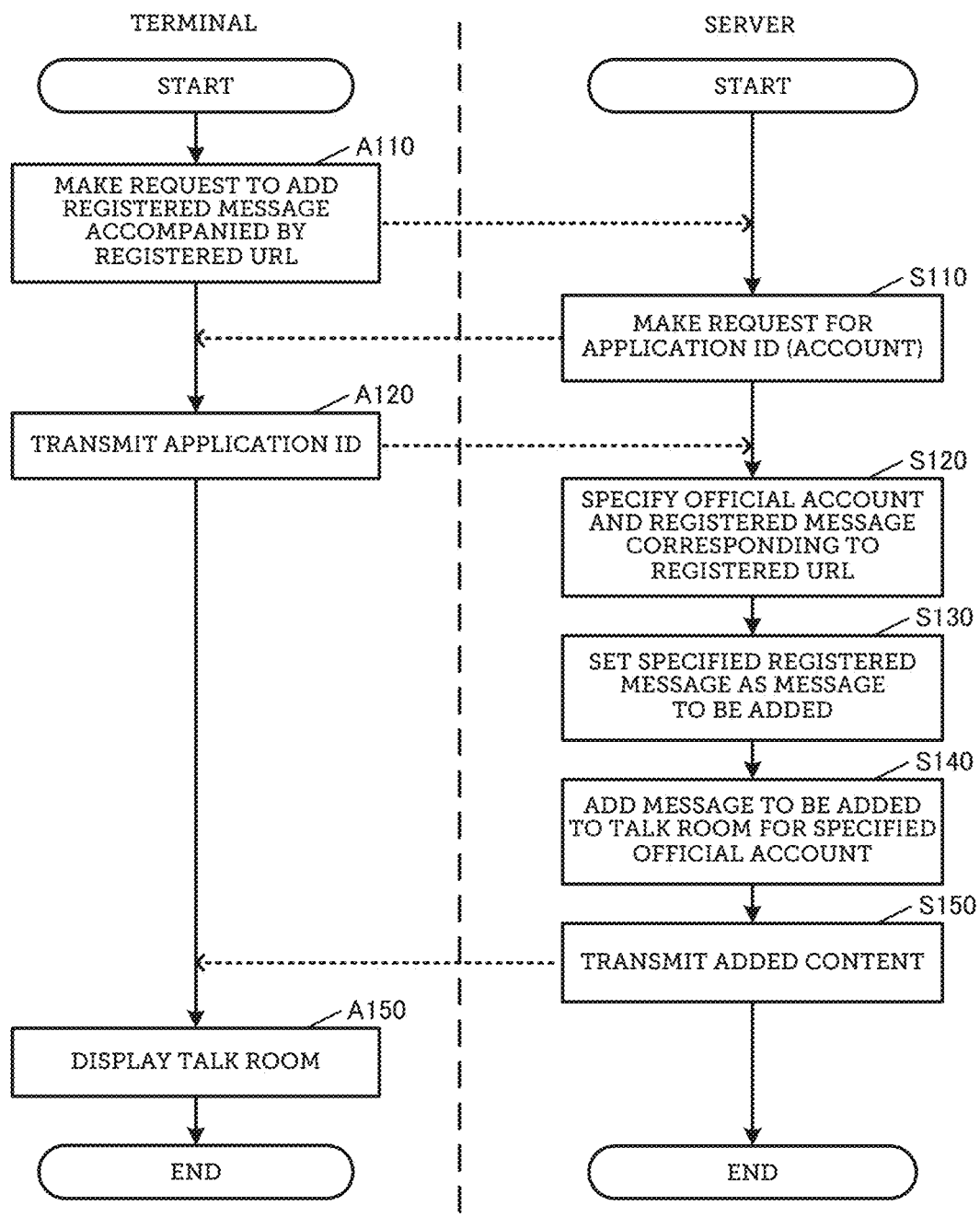
FIG. 12 is a flowchart showing an example flow of processing that is performed by the devices according the first example embodiment.

FIG. 12 is a flowchart showing an example flow of processing that is performed by the devices according to the first example embodiment. In this figure, processing that is performed by the controller 21 of the terminal 20 is shown on the left side, and processing that is performed by the controller 11 of the server 10 is shown on the right side.

In the following description, it is assumed that the user of a terminal 20 (a general account) and an OA operator (an official account) have already been registered as friends in the messaging application.

Note that such processing is only an example of processing for realizing a method according to an example embodiment, and the present disclosure is not limited to such processing. Another step may be added to such processing, or some steps may be omitted (deleted) therefrom.

The same applies to each of the flowcharts (processing) described below.

First, the registered URL acquirer 211 of the terminal 20 acquires a registered URL from a location on the network 30 according to a user operation performed on the input/output part 23, and the terminal 20 requests that the server 10 add a registered message accompanied by the acquired URL, using the communication I/F 22 (A110).

In response to this addition request, the controller 11 of the server 10 requests an application ID (a general account in this example) (a non-limiting example of the user identification information) from the terminal 20, using the communication I/F 14 (S110).

In response to this request, the controller 21 of the terminal 20 transmits the application ID of the user of the terminal 20 to the server 10, using the communication I/F 22 (A120).

In this example of processing, the terminal 20 transmits the application ID of the user to the server 10 (A120) in response to the request for the application ID from the server 10 (S110). However, the terminal 20 may transmit the application ID of the user of the terminal 20 to the server 10 in A110.

Instead of or in addition to the application ID, information desired for login authentication (non-limiting examples of which include an e-mail address, a password, a telephone number, and so on) by the messaging application, may be transmitted from the terminal 20 to the server 10 as user identification information.

Upon receiving the application ID from the terminal 20 using the communication I/F 14, the registered message specifier 115 (the registered message manager 114) of the server 10 references the OA operator-specific registered message management database 155 stored in the storage 15 to specify (1) the official account (the official account name) corresponding to the registered URL specified by the addition request from the terminal 20 and (2) the registered message (the text and the attached image) stored in association with the registered URL (S120).

Thereafter, the talk information updater 113 (the talk information manager 112) of the server 10 sets the registered message specified in S120 as a message to be added to the talk room for the official account (hereinafter referred to as the "message to be added") (S130).

Next, the talk information updater 113 of the server 10 (or the talk information manager 112) adds the message to be added set in S130 to the talk room for the official account specified in S120 (S140). For example, the message to be added is added to talk information regarding talks between the application ID (a general account) of the user of the terminal 20 corresponding thereto and the application ID (an official account) of the OA operator corresponding thereto contained in the talk information management database 156, so that the talk information is updated.

Thereafter, the controller 11 of the server 10 transmits the content added to the talk room (the registered message added to the talk room) to the terminal 20, using the communication I/F 22 (S150). Thereafter, the controller 11 of the server 10 terminates processing.

Upon receiving the added content from the server 10 using the communication I/F 22, the controller 21 of the terminal 20 displays the talk room for the official account, containing the added registered message, on the display 24 (A150). Thereafter, the controller 21 of the terminal 20 terminates processing.

Effects

According to the aforementioned example embodiments, in the communication system 1A (a non-limiting example of the system that includes at least an information processing device for providing a messaging service), the server 10 (a non-limiting example of the information processing device) includes the storage 15 and the controller. The storage 15 includes talk information management database 156 (a non-limiting example of the talk storage) configured to store talk information that contains a message from an OA operator (a non-limiting example of the second user) to a user of a terminal 20 in association with the application ID (a non-limiting example of the first user identification information) of the user (a non-limiting example of the first user) of the terminal 20.

Upon receiving a registered message from the OA operator device 40, the controller 11 generates a registered URL (a non-limiting example of the specification information) that specifies the registered message, or displays the registered URL on the display 13, or transmit the registered URL to the OA operator devices 40 using the communication I/F 14.

Thereafter, in response to the request to add a registered message accompanied by the application ID of the user of the terminal 20 and a first registered URL, the controller 11 adds a first registered message that is specified by the first registered URL to the talk information management database 156, and in response to a request to add a registered message accompanied by the application ID of the user of the terminal 20 and a second registered URL, the controller 11 adds a second registered message that is specified by the second registered URL to the talk information management database 156.

One example of the effects that can be achieved by such a configuration is that the first registered message specified by the first specification information and the second registered message specified by the second specification information can each be added to the talk storage, which improves user convenience.

Further, according to the aforementioned example embodiments, the talk information management database 156 is configured to store talk information that contains a message from an OA operator (a non-limiting example of the second user) specified by the application ID that is an official account (a non-limiting example of the second user identification information of the second type) to the user (a non-limiting example of the first user) of the terminal 20, in association with the application ID that is a general account (a non-limiting example of the first user identification information of the first type).

One example of the effects that can be achieved by such a configuration is that a message from the second user to the first user can be stored in the talk storage, using different types of user identification information.

In addition, the aforementioned example embodiments show that the first registered message specified by the first specification information and the second registered message specified by the second specification information are different messages.

One example of the effects that can be achieved by such a configuration is that different registered messages specified by different pieces of specification information can be added to the talk storage. Thus, it is possible to provide the first user with different registered messages, depending on the reason, purpose, and motivation for the first user to access the official account of the second user, for example, which improves user convenience.

First Modification of First Example Embodiment (1)

In the aforementioned example embodiments, it is assumed that the user of a terminal 20 (a general account) and an OA operator (an official account) have already been registered as friends in the messaging application. However, the present disclosure is not limited in such a way.

In a non-limiting example, in the initial state, the user of the terminal 20 (a general account) and the OA operator (an official account) may optionally be not registered as friends, and the controller 11 of the server 10 may optionally register friend upon a request from the terminal 20 accompanied by a registered URL being received by the server 10.

Display Screen

Figure 13:
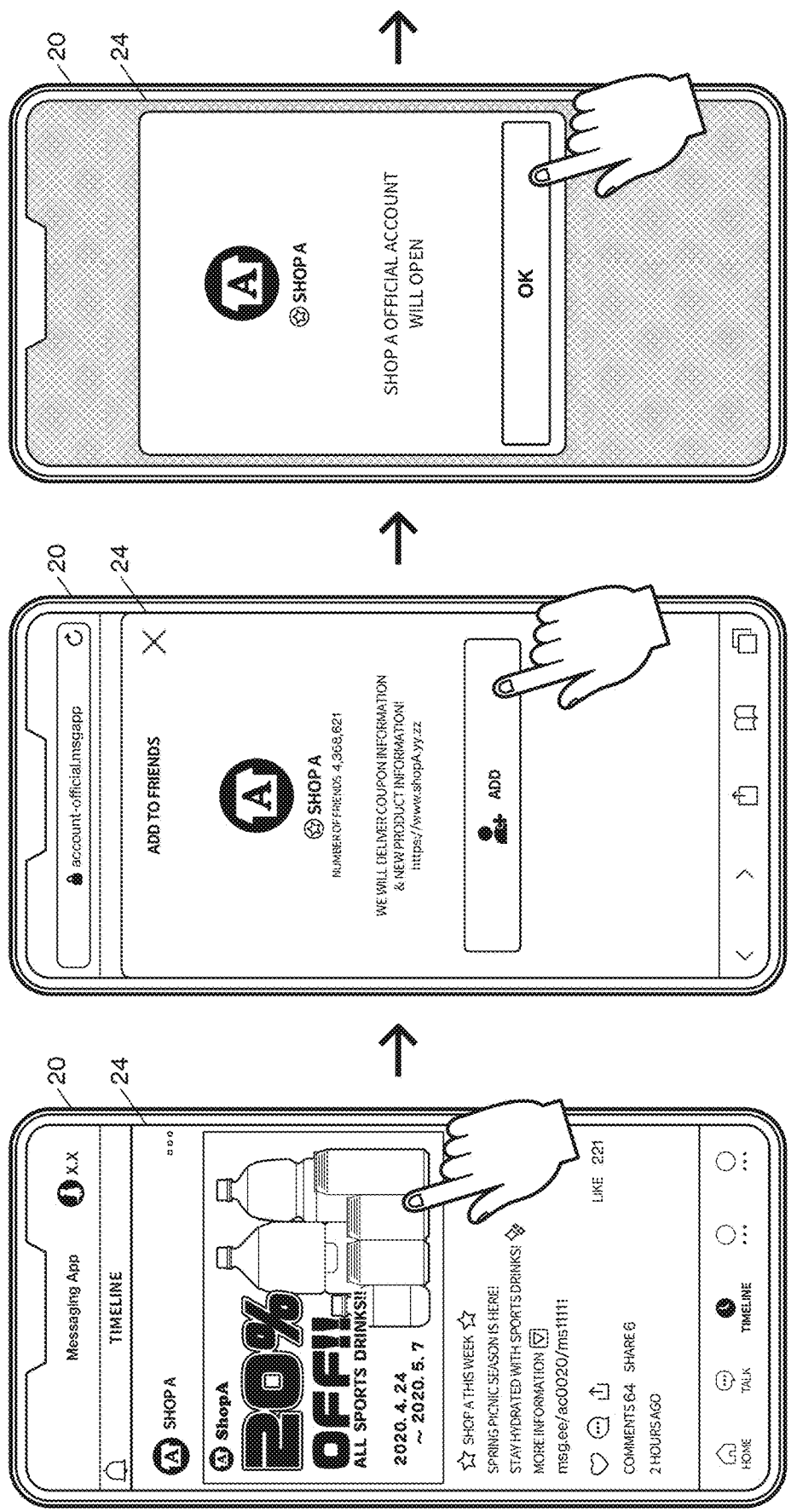
FIG. 13 is a diagram showing examples of screens that are to be displayed on a display of a terminal according to a first modification of the first example embodiment.

FIG. 13 is a diagram showing examples of screens that are to be displayed on the display 24 of the terminal 20 according to a first modification of the first example amendment. Here, as in FIGS. 10 and 11, the screen to be displayed on the display 24 of the terminal 20 of the user X.X is illustrated.

In a non-limiting example, if the user X.X performs an operation on a registered URL or the like on the left screen in FIG. 10, a friend registration screen shown in the middle part of FIG. 13, which is a non-limiting example, is displayed on the display 24.

In a non-limiting example, this friend registration screen displays the text "ADD TO FRIENDS", and information regarding the shop A is displayed below the text. For example, in a non-limiting example, an icon image of the shop A, the letters "Shop A" representing the name of the shop, the total number of users (general accounts) that have registered the official account of the shop A as a friend, and the URL of the homepage of the shop A are displayed.

In addition, in a non-limiting example, a friend addition button that contains letters "ADD", which is used to add the official account of the shop A as a friend, is displayed below such information. Upon the friend addition button being operated by the user X.X, friend registration processing is performed by the server 10 to associate the official account of the shop A with the account of the user X.X as a friend. Thereafter, in a non-limiting example, the screen switches to the middle screen in FIG. 10, and ultimately the right screen in FIG. 10 is displayed.

In this case, the display transition in the case where the message regarding the coupon for the finest roasted coffee illustrated in FIG. 11 is displayed in the talk room for the official account of the shop A is the same as above, and therefore the illustration and description thereof will be omitted here.

Processing

Figure 14:
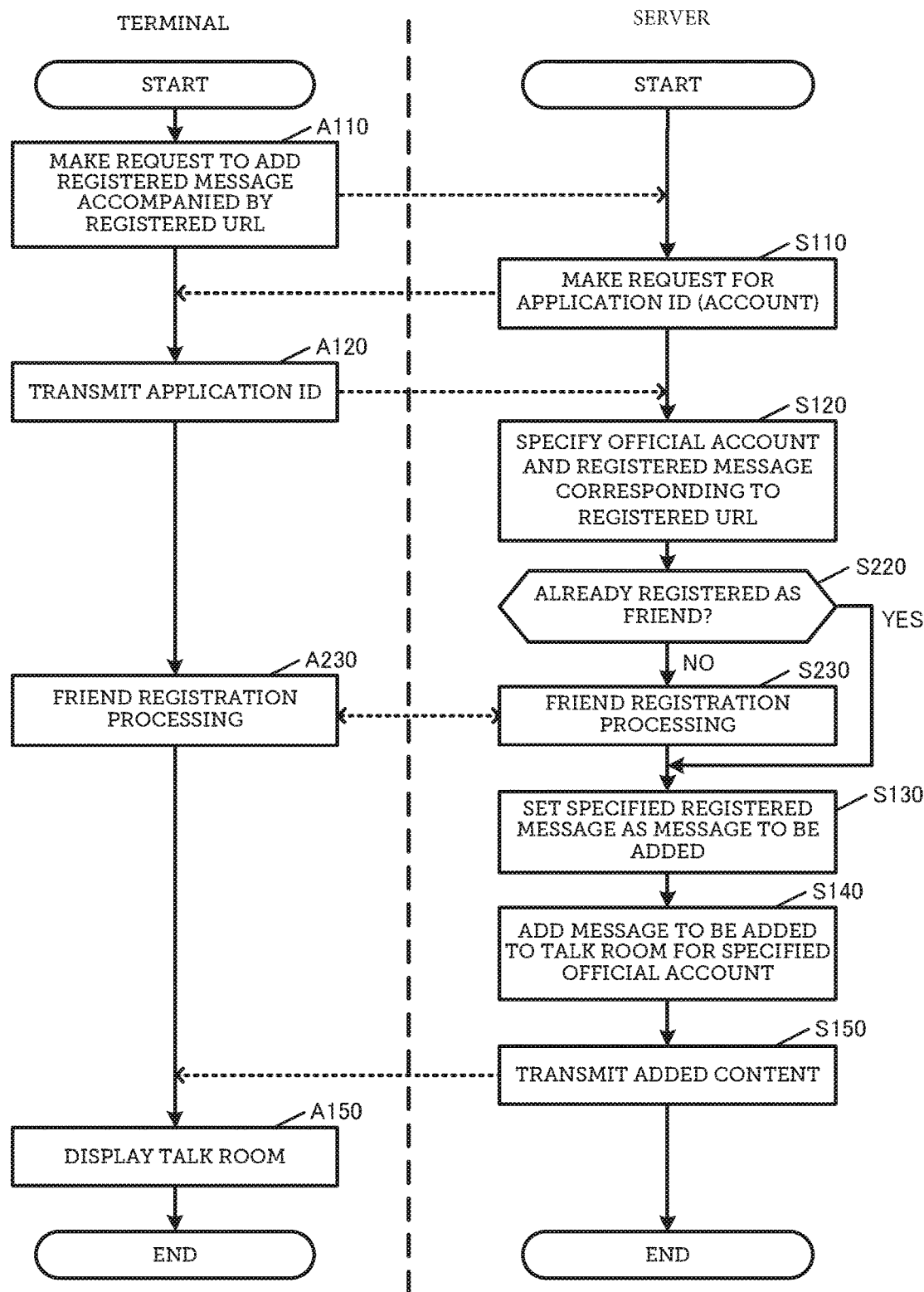
FIG. 14 is a flowchart showing an example flow of processing that is performed by devices according to the first modification of the first example embodiment.

FIG. 14 is a flowchart showing an example flow of processing that is performed by the devices according the first modification of the first example embodiment. In this figure, processing that is performed by the controller 21 of the terminal 20 is shown on the left side, and processing that is performed by the controller 11 of the server 10 is shown on the right side.

Note that the same steps as those in the flowchart already described will be indicated with the same reference numerals and will not be described again.

The same applies to each of the other example embodiments and modifications.

After S120, the controller 11 of the server 10 references the friend management data 154 stored in the storage 15, and determines whether or not the application ID (a general account) received from the terminal 20 and the official account specified in S120 are registered as friends (S220). If friend registration has been made (S220: YES), the controller 11 of the server 10 advances processing to S130.

On the other hand, if friend registration has not been made (S220: NO), the friend manager 116 of the server 10 performs friend registration processing with respect to the terminal 20 (S230).

For example, in a non-limiting example, information that prompts the user to register the official account specified in S120, as a friend, is transmitted to the terminal 20 using the communication I/F 14. Thereafter, if information indicating an agreement with the friend registration is received from the terminal 20, in a non-limiting example, the application ID corresponding to the official account specified in S120 is set as the application ID of a friend, and the application ID is stored in the friend management data 154 together with the user name (the official account name) of the friend, in association with the a above-described application ID of the user of the terminal 20. Thereafter, the controller 11 of the server 10 advances processing to S130.

The controller 21 of the terminal 20 performs friend registration processing according to the above-described processing by the server 10 (A230). Thereafter, the controller 21 of the terminal 20 advances processing to A150.

In the above processing, the controller 11 of the server 10 may perform processing to ask the user of the terminal 20 whether or not to agree with the terms of use or the like of the official account, either before or after the friend registration processing (S230), or at the same timing as the friend registration processing, in a non-limiting example.

In this case, in a non-limiting example, the controller 11 of the server 10 prompts the user of the terminal 20 to determine whether or not to agree to transmit information such as the user name and attribute information regarding the user from the server 10 to the OA operator devices 40 (from the massaging service operator to the OA operator). Thereafter, if the consent of the user is confirmed, the controller 11 of the server 10 can apply a setting to allow the addition of the registered message to the talk room for the official account.

Second Modification of First Example Embodiment (2)

The following illustrates a case where an application for an SNS (hereinafter referred to as the "SNS application") is used as an application different from the messaging application described in the above example embodiment (e.g., first modification (1)).

In a non-limiting example, the SNS application in the present modification is configured to enable the users of terminals 20 to have connection with each other by using a function called "follow" instead of the "friend" function of the messaging application described in the above example embodiment (e.g., modification (1)). In a non-limiting example, this SNS application is basically an open format SNS application that can send a message (content) that can be viewed by anyone, from the terminal 20.

In a non-limiting example, "follow" means associating the account of one user with the account of another user (associating one user with another user) in the SNS application. In a non-limiting example, other users that follow the user and the accounts of such users are referred to as "followers".

In this case, information transmitted from the terminal 20 of one user in the SNS application is viewed by another user different from the one user, using the terminal 20 of the other user. Thereafter, in a non-limiting example, when the other user is interested in the information transmitted from the one user, the other user performs a follow operation from their terminal 20 to follow the one user via the server (not shown) for the SNS application.

Further, in a non-limiting example, the information transmitted from the terminal 20 of the one user in the SNS application can be delivered to the terminal 20 of the user that is a follower at any time via the server for the SNS application. In this case, the terminal 20 of the user that is a follower displays the information delivered thereto via the server for the SNS application, on the timeline screen of the SNS application.

Display Screen

Figure 15:
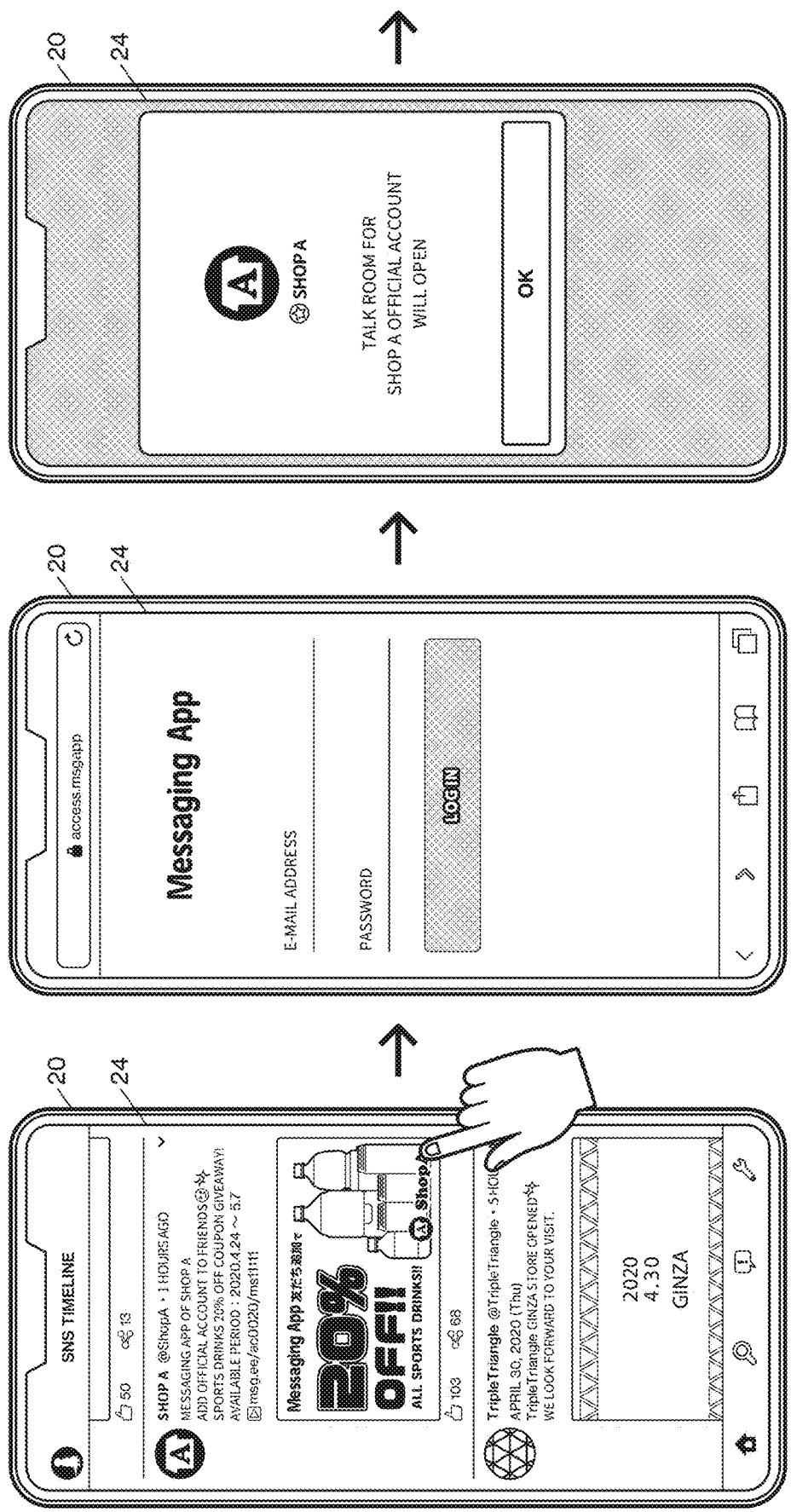
FIG. 15 is a diagram showing examples of screens that are to be displayed on a display of a terminal according to the second modification of the first example embodiment.

FIG. 15 shows an example of transition between screens on the display 24 of the terminal 20 corresponding to FIG. 10, and shows examples of screens that are to be displayed on the display 24 of the terminal 20 of the user X.X.

In this example, as shown in the left part of FIG. 15, information indicating that if a user registers the official account of "Shop A" as a friend in the messaging application, the user can receive the service of "20% OFF ALL SPORTS DRINKS", and a registered URL and a banner image are displayed on the timeline screen of the SNS application as information posted by a user followed by the user X.X.

Thereafter, upon an operation being made on the registered URL or the banner image, the login screen shown in the middle part of the FIG. 15 is displayed on the terminal 20 of the user X.X to enable the user to log into the messaging application, in a non-limiting example.

In addition, in a mere example, considering security issues, in order to enable authentication on the server 10 side regarding whether or not the user is a legitimate user of the messaging service, the login screen for the web version of the messaging application is opened and displayed by the web browser of the terminal 20.

In a non-limiting example, the login screen displays an input field for entering registration information regarding the user (non-limiting examples of which include an e-mail address, a password, a phone number, and so on), and when such registration information is entered and the login button is operated, login authentication is performed by the server 10. Thereafter, if the result of the login authentication is "OK" and the login to the messaging application is successful, the terminal 20 requests that the server 10 add a registered message associated with the above-described registered URLs.

Thereafter, in a non-limiting example, the screen shown in the right part of FIG. 15 (non-limiting examples of which include a screen for determining whether or not to use the messaging application installed in the terminal 20 to open the talk room for the official account of the shop A) is displayed, and thereafter the same talk room as that shown in the above-described right part of FIG. 10 is displayed.

In this case, the display transition in the case where the message regarding the coupon for the finest roasted coffee illustrated in FIG. 11 is displayed in the talk room for the official account of the shop A is the same as above, and therefore the illustration and description thereof will be omitted here.

Third Modification of First Example Embodiment (3)

As described with reference to FIG. 9, not only the server 10, but also each terminal 20 stores the talk information history of the terminal 20 in the talk information data 286 in the storage 28.

Therefore, the controller 21 of the terminal 20 may perform part of the processing performed by the server 10 in the above-described embodiment.

Figure 16:
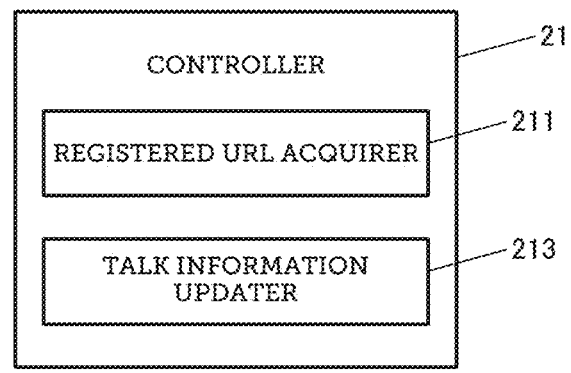
FIG. 16 is a diagram showing examples of functions implemented by the controller included in the terminal according to a third modification of the first example embodiment.

FIG. 16 is a diagram showing examples of functions implemented by the controller 21 of each terminal 20 in a third modification of the first example embodiment.

The controller 21 includes a talk information updater 213, which is a non-limiting example, in addition to the registered URL acquirer 211.

In this case, in A110 in the processing shown in FIG. 12, which is a non-limiting example, the controller 21 of the terminal 20 requests the official account accompanied by a registered URL acquired from a registered URL-posted page or the like, from the server 10, using the communication I/F 22.

In response to this acquisition request, the controller 11 of the server 10 transmits the official account and the registered messages specified in S120, to the terminal 20, using the communication I/F 14.

Upon receiving the official account and the registered messages from the server 10 using the communication I/F 22, the talk information updater 213 of the terminal 20 adds the received registered messages to talk information regarding talks exchanged between the general account of the user of the terminal 20 and the received official account, contained in the talk information stored in the talk information data 286 (FIG. 9) in the storage 28.

Unlike this example, the controller 21 of the terminal 20 may specify the registered messages associated with the acquired registered URL, and add the specified registered messages to perform an update.

For example, in A110 in the processing shown in FIG. 12, which is a non-limiting example, the controller 21 of the terminal 20 requests the OA operator-specific registered message management data of the OA operator accompanied by the registered URL acquired from a registered URL-posted page or the like. The OA operator is associated with the registered URL, or the registered message management data of the official account associated with the registered URL, from the server 10, using the communication I/F 22.

In response to this acquisition request, the controller 11 of the server 10 transmits the OA operator-specific registered message management data corresponding thereto stored in the OA operator-specific registered message management database 155, or the registered message management data of the official account corresponding thereto, to the terminal 20, using the communication I/F 14.

Upon receiving the above-described data from the server 10 using the communication I/F 22, the controller 21 of the terminal 20 specifies the registered messages associated with the registered URL based on the received data. Thereafter, the talk information updater 213 of the terminal 20 adds the received registered messages to talk information regarding talks exchanged between the general account of the user of the terminal 20 and the received official account, contained in the talk information stored in the talk information data 286 (FIG. 9) in the storage 28.

The same applies to the example embodiments described below.

In the present example embodiments, each terminal 20 includes the storage 28 and the controller 21. Talk information management data 286 (a non-limiting example of the talk storage) is configured to store talk information that contains a message from an OA operator (a non-limiting example of the second user) to the user of the terminal 20 in association the general account (a non-limiting example of the first user identification information) of the user (a non-limiting example of the first user) of the terminal 20.

The controller 21 (in particular, the registered URL acquirer 211) acquires a registered URL (a non-limiting example of specification information) that is used to specify one or more registered messages specified by the registered URL.

Thereafter, the controller 21 (in particular, the talk information updater 213) adds the first registered message specified by the first registered URL to the talk information data 286 based on a request accompanied by the application ID (a non-limiting example of the first user identification information) of the user of the terminal 20 and the first registered URL (a non-limiting example of the first specification information), and adds the second registered message specified by the second registered URL to the talk information data 286 based on a request accompanied by the application ID (a non-limiting example of the first user identification information) of the user of the terminal 20 and the second registered URL (a non-limiting example of the second specification information).

One example of the effects that can be achieved by such a configuration is that the first registered message specified by first specification information and the second registered message specified by second specification information can be easily added to the talk storage on the terminal side. Further, part of the processing performed by the server can be omitted, and therefore the processing load on the server can be reduced.

Modification (4)

The above example embodiment illustrates a registered message with which coupon information, which is an example of service information regarding a service provided by an OA operator, is associated. However, the present disclosure is not limited in such a way. In addition to coupon information, information regarding any service provided by the OA operator may be associated with the registered message. That is, information that can be associated with the registered message is not limited to coupon information.

Further, the registered message does not necessarily have to be a message with which service information is associated. For example, in a non-limiting example, a message that promotes, advertises, or publicizes an OA provider or services provided by an OA provider, or a message such as an announcement periodically transmitted from an OA provider, may optionally be registered as a registered message.

Note that, in a non-limiting example, these registered messages of different types may each be associated with information indicating the type of the message so that the messages can be distinguished/discerned.

Modification (5)

In the above example embodiment, the first registered message specified by the first specification information and the second registered message specified by the second specification information are different messages. However, the present disclosure is not limited in this way.

For example, the first registered message specified by the first specification information and the second registered message specified by the second specification information may be the same message.

Second Example Embodiment

A second example embodiment is an example in which a plurality of (two or more) registered messages are associated with one registered URL.

The descriptions in the second example embodiment are applicable to any of the other example embodiments and other modifications.

Further, the same components as those already described will be indicated with the same reference numerals and will not be described again.

FIG. 17 is a diagram showing an example of registered message management data according to the present example embodiment.

The following description illustrates the data corresponding to the registered message management data contained in the OA operator-specific registered message management data of the OA operator that is associated with the application ID "ac0020" (=shop A), which is shown in the foremost dataset in the OA operator-specific registered message management database 155 in FIG. 7.

In this registered message management data, two registered messages (the texts and the attached images) are stored in association with each of the first registered URL and the second registered URL. For each of the first registered URL and the second registered URL, the first registered message is the same as that shown in FIG. 7.

On the other hand, for each of the first registered URL and the second registered URL, a common message (the same message) may be stored as the second registered message in association with the registered URLs.

For example, common text data saying "ELECTRONIC MONEY PAYMENT IS NOW AVAILABLE", which is text corresponding to the second registered message, and similarly, common image data, which is an attached image, are stored in association with each of the first registered URL and the second registered URL.

In this case, in a non-limiting example, the controller 11 of the server 10 sets two registered messages associated with the registered URLs, as the messages to be added, in S130 shown in FIGS. 12 and 14.

Note that instead of setting all of the plurality of registered messages associated with the registered URLs, as the message to be added, some of the registered messages may optionally be set as the messages to be added.

Further, although an example in which some of a plurality of registered messages associated with different registered URLs are the same message, all of the registered messages may be different for each registered URL.

In addition, the number of registered messages may be different for each registered URL.

Effects

In the second example embodiment, the controller 11 of the server 10 adds the plurality of registered messages (non-limited examples of the plurality of first registered messages) specified by the first registered URL (a non-limiting example of the first specification information), to the talk storage. The second example embodiment also illustrates a configuration with which the controller 11 of the server 10 adds the plurality of registered messages (non-limited examples of the plurality of second registered messages) specified by the second registered URL (a non-limiting example of the second specification information), to the talk storage.

One example of the effects that can be achieved by such a configuration is that the plurality of first registered messages specified by the first specification information and the plurality of second registered messages specified by the second specification information can be added to the talk storage, and the user convenience of the user of the messaging service can be improved.

Further, the second example embodiment illustrates a configuration in which at least one message of the plurality of registered messages (non-limiting examples of the plurality of first registered messages) specified by the first registered URL and at least one message of the plurality of registered messages (non-limiting examples of the plurality of second registered messages) specified by the second registered URL are the same messages.

One example of the effects that can be achieved by such a configuration is that, since at least one message of the plurality of first registered messages and at least one message of the plurality of second registered messages are the same messages, it is possible to provide the same content to the user even if specification information is different for each, and user convenience can be improved while consuming less computational and/or communicational resources.

Third Example Embodiment

A third example embodiment is, as with the second example embodiment, an example in which a plurality of (two or more) registered messages are associated with one registered URL.

The third example embodiment is different from the second example embodiment in that the message to be added is selectively set from among a plurality of registered messages associated with a registered URL, based on conditions.

The descriptions in the third example embodiment are applicable to any of the other example embodiments and other modifications.

Further, the same components as those already described will be indicated with the same reference numerals and will not be described again.

Data Structure

FIG. 18 is a diagram showing an example of registered message management data according to the third example embodiment.

The following description illustrates the data corresponding to the registered message management data contained in the OA operator-specific registered message management data of the OA operator that is associated with the application ID "ac0020" (=shop A), which is shown in the foremost dataset in the OA operator-specific registered message management database 155 in FIG. 7.

As in FIG. 7, this registered message management data contains a registered message with which coupon information for products sold by the shop A is associated, but the data structure and the content of data are partially different.

For example, in a non-limiting example, this registered message management data stores registered URLs, conditions, texts, attached images, the maximum numbers of downloads, and the numbers of downloads in association with each other.

The conditions are each used to set the registered message associated with the registered URL corresponding thereto as the message to be added.

The maximum number of downloads is the number of times set as the maximum number of times the coupon associated with the registered message (the text and the attached image) can be downloaded using the terminal 20, or a desired (or alternatively, predetermined) number of times. In a non-limiting example, the maximum number of downloads can be set by the server 10 or the OA operator device 40.

The number of downloads is the number of times the coupon associated with the registered message (the text and the attached image) is actually downloaded using the terminal 20. This number of downloads is incremented by "1" (to be updated) each time the coupon is downloaded.

In the example shown in this figure, the maximum number of downloads is not set for the registered message corresponding to the first registered URL, and is set to "– (none)". Accordingly, the condition is also set to "– (none)". The number of downloads stores the total number of aggregated downloads.

In this example, the number of downloads is counted even for the registered message for which the maximum number of downloads is not set, but the number of downloads may not be counted.

In contrast, for the registered message corresponding to the second registered URL, "1000" is set as the maximum number of downloads. Accordingly, "MAXIMUM NUMBER OF DOWNLOADS NOT REACHED" and "MAXIMUM NUMBER OF DOWNLOADS REACHED" are defined as conditions.

"MAXIMUM NUMBER OF DOWNLOADS NOT REACHED" is a condition indicating that the number of downloads is equal to or less than the maximum number of downloads (the number of downloads≤the maximum number of downloads).

As the text corresponding to this condition, text data "TRY OUR NEW FINEST ROASTED COFFEE AT HALF PRICE*LIMITED COUPON FOR THE FIRST 1,000 CUSTOMERS" is set, and the image data of the attached image is also set.

On the other hand, "MAXIMUM NUMBER OF DOWNLOADS REACHED" is a condition indicating that the number of downloads is greater than the maximum number of downloads (the number of downloads>the maximum number of downloads).

As the text corresponding to this condition, text data "THIS CAMPAIGN HAS ENDED AS THE FIRST 1,000 ENTRIES HAVE BEEN RECEIVED. PLEASE WAIT FOR THE NEXT CAMPAIGN" is set, and the image data of the attached image is also set.

In this way, in the above-described example, the registered message for when the maximum number of downloads has not been reached is added to the talk room for the official account until the number of downloads reaches the maximum number of downloads (the number of downloads≤the maximum number of downloads), whereas the registered message for when the maximum number of downloads has been reached is added to the talk room for the official account after the number of downloads reaches the maximum number of downloads (the number of downloads>the maximum number of downloads).

Note that, in FIG. 18, fields for "condition" and "the maximum number of downloads" are provided to facilitate understanding. However, in a non-limiting example, these fields may be realized by a program rather than being managed as data.

Further, as the number of downloads reaches the maximum number of downloads, different values may be associated with each official account and/or each registered URL, or the same value may be associated therewith.

Display Screen

Figure 19A:
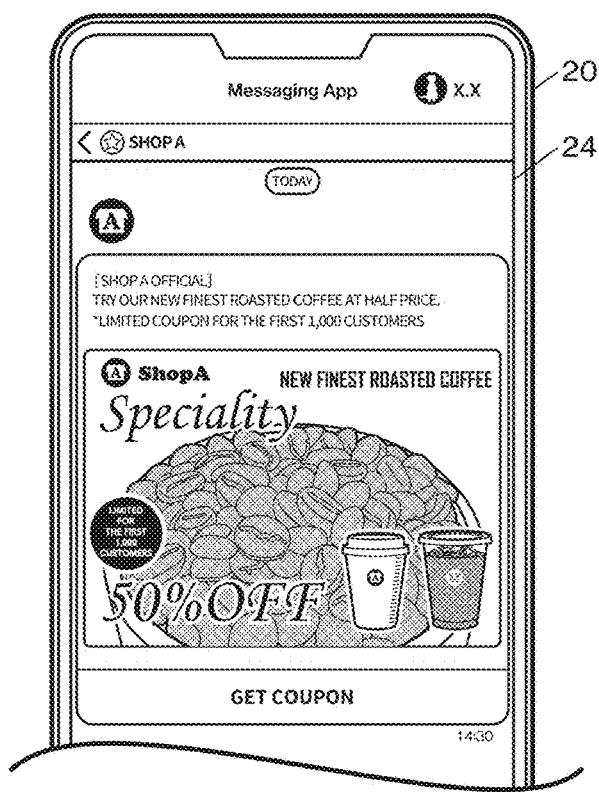
FIGS. 19A and 19B are diagrams showing examples of screens that are to be displayed on a display of a terminal according to the third embodiment.
Figure 19B:
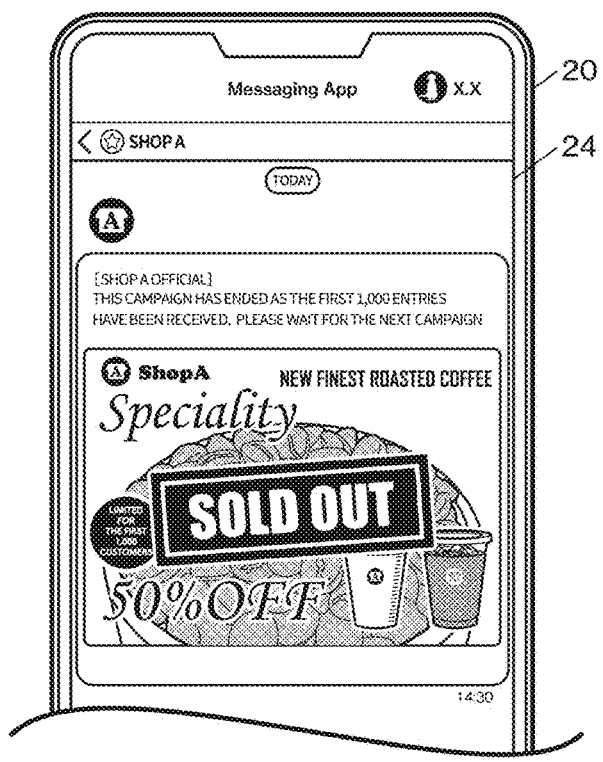

FIGS. 19A and 19B show examples of screens that are displayed on the display 24 of the terminal 20 in the present example embodiment, and show examples of talk rooms for the official account of the shop A described above.

This talk room is a talk room for the official account corresponding to FIG. 11, but a different registered message is added thereto.

FIG. 19A shows an example of a talk room displayed until the number of downloads of a coupon reaches the maximum number of downloads. For example, FIG. 19A shows a state in which the content corresponding to the text for when the maximum number of downloads has not been reached, from among the registered messages associated with the second registered URL in FIG. 18, has been added as a message from the shop A on the left side in the screen.

For example, letters "TRY OUR NEW FINEST ROASTED COFFEE AT HALF PRICE (50% OFF)*LIMITED COUPON FOR THE FIRST 1,000 CUSTOMERS" are displayed as text, and a coupon image that in which "FINEST ROASTED COFFEE AT HALF PRICE (50% OFF)" and "LIMITED FOR THE FIRST 1,000 CUSTOMERS" is illustrated is displayed as the attached image. Because the campaign has not been ended, a coupon acquisition button showing "GET COUPON" is displayed below the coupon image, so that the user can download and acquire the coupon by operating this coupon acquisition button.

FIG. 19B shows an example of a talk room displayed after the number of downloads of the coupon has reached the maximum number of downloads. For example, FIG. 19B shows a state in which the content corresponding to the text for when the maximum number of downloads has been reached, from among the registered messages associated with the second registered URL in FIG. 18, has been added as a message from the shop A on the left side in the screen.

For example, letters "THIS CAMPAIGN HAS ENDED AS THE FIRST 1,000 ENTRIES HAVE BEEN RECEIVED. PLEASE WAIT FOR THE NEXT CAMPAIGN" are displayed as the text, and a coupon image on which an image that contains letters "SOLD OUT" is superimposed is also displayed as an attached image.

Because the campaign has already ended, FIG. 19B does not show the coupon acquisition button unlike FIG. 19A, so that that user cannot acquire the coupon.

Processing

Figure 20:
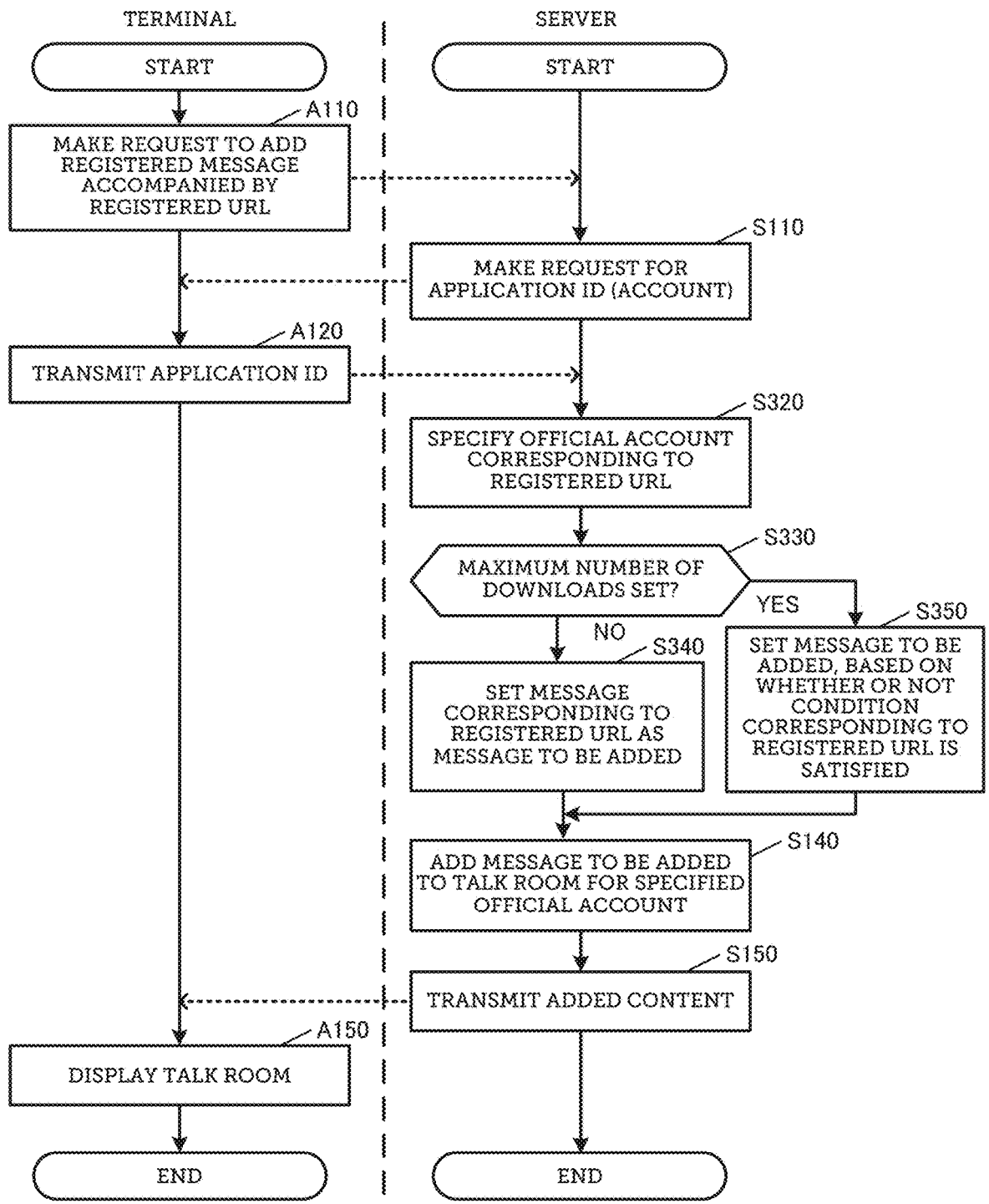
FIG. 20 is a flowchart showing an example flow of processing that is performed by devices according to the third example embodiment.

FIG. 20 is a flowchart showing an example flow of processing that is performed by the devices according to the present example embodiment. In this figure, processing that is performed by the controller 21 of a terminal 20 is shown on the left side, and processing that is performed by the controller 11 of the server 10 is shown on the right side.

Here, the description is based on the assumption that the user of the terminal 20 (a general account) and an OA operator (an official account) have already been registered as friends in the messaging application.

After S110, upon receiving the application ID from the terminal 20 using the communication I/F 14, the registered message specifier 115 (the registered message manager 114) of the server 10 references the OA operator-specific registered message management database 155 stored in the storage 15 to specify the official account (the official account name) corresponding to the registered URL specified by the addition request from the terminal 20 (S320).

Thereafter, the registered message specifier 115 (the registered message manager 114) of the server 10 references the OA operator-specific registered message management database 155 stored in the storage 15 to determine whether or not the maximum number of downloads is set in association with the above-described registered URL (S330).

If it is determined that the maximum number of downloads is not set (S330: NO), the controller 11 of the server 10 sets the registered message stored in association with the above-described registered URL as the message to be added (S340). Thereafter, the controller 11 of the server 10 advances processing to S140.

On the other hand, if it is determined that the maximum number of downloads is set (S330: YES), the controller 11 of the server 10 sets a message to be added based on whether or not the condition stored in association with the above-described registered URL is satisfied (S350).

For example, if the number of downloads has not reached the maximum number of downloads, the registered message for when the maximum number of downloads has not been reached, stored in association with the above-described registered URL, is set as the message to be added.

On the other hand, if the number of downloads has reached the maximum number of downloads, the registered message for when the maximum number of downloads has been reached, stored in association with the above-described registered URL, is set as the message to be added.

Thereafter, the controller 11 of the server 10 advances processing to S140.

Effects

In the third example embodiment, the controller 11 of the server 10 adds either one registered message of a plurality of registered messages (a non-limiting example of the plurality of first registered messages) specified by the first registered URL (a non-limiting example of the first specification information), to the talk storage. The third example embodiment also illustrates a configuration with which the controller 11 of the server 10 adds one registered message of the plurality of registered messages (non-limited examples of the plurality of second registered messages) specified by the second registered URL (a non-limiting example of the second specification information), to the talk storage.

One example of the effects that can be achieved by such a configuration is that one registered message of the plurality of first registered messages specified by the first specification information can be added to the talk storage, and the user convenience of the user of the messaging service can be improved.

Similarly, one registered message of the plurality of second registered messages specified by the second specification information can be added to the talk storage, and the user convenience of the user of the messaging service can be improved.

Further, the third example embodiment illustrates a configuration with which the controller 11 of the server 10 determines the registered message to be added to the talk storage, based on a condition.

One example of the effects that can be achieved by such a configuration is that the registered messages to be added to the talk storage can be flexibly determined, and the versatility of the messaging service can be improved.

Further, in the third example embodiment, the registered message is associated with coupon information (a non-limiting example of service information regarding a service provided by the second user). The third example embodiment shows a configuration with which the controller 11 of the server 10 determines the registered message to be added to the talk storage based on a condition regarding the number of downloads of coupon information (a non-limiting example of the condition regarding the number of times the service information associated with the registered message has been acquired based on the fact that the registered message is added to the talk storage).

One example of the effects that can be achieved by such a configuration is that the registered messages to be added to the talk storage can be flexibly and appropriately determined based on the condition regarding the number of times the service information regarding the service provided by the second user has been acquired.

First Modification of Third Example Embodiment (1)

In relation to the content described in the second example embodiment, in the third example embodiment, in a non-limiting example, some of a plurality of registered messages associated with different registered URLs may be the same, and one of the plurality of registered messages associated with the registered URL may be selectively set as the message to be added, based on a condition.

FIG. 21 is a diagram showing an example of registered message management data according to the first modification of the third example embodiment.

This example illustrates the data corresponding to the registered message management data contained in the OA operator-specific registered message management data of the OA operator that is associated with the application ID "ac0020" (=shop A), which is shown in the foremost dataset in the OA operator-specific registered message management database 155 in FIG. 18.

In this registered message management data, a condition and a maximum number of downloads is set for each of the first registered URL and the second registered URL.

The registered message associated with the condition "MAXIMUM NUMBER OF DOWNLOADS NOT REACHED" for each of the first registered URL and the second registered URL is the same as that in FIG. 18.

On the other hand, for each of the first registered URL and the second registered URL, the same message (a common message) is stored as a registered message associated with the condition "MAXIMUM NUMBER OF DOWNLOADS NOT REACHED" in association with the registered URLs. For example, the common text data "THIS CAMPAIGN HAS ENDED AS THE FIRST 1,000 ENTRIES HAVE BEEN RECEIVED. PLEASE WAIT FOR THE NEXT CAMPAIGN" is set as the text of the registered message associated with the condition "MAXIMUM NUMBER OF DOWNLOADS NOT REACHED", and the common image data is also set as the attached image.

The present modification illustrates a configuration in which at least one message of the plurality of registered messages (non-limiting examples of the plurality of first registered messages) specified by the first registered URL and at least one message of the plurality of registered messages (non-limiting examples of the plurality of second registered messages) specified by the second registered URL are the same messages.

One example of the effects that can be achieved by such a configuration is that, because at least one message of the plurality of first registered messages and at least one message of the plurality of second registered messages are the same messages, it is possible to provide the same content to the user even if the specification information is different for each, and user convenience can be improved while consuming less computational and/or communicational resources.

In addition, according to the present modification, one of the registered messages corresponding to whether or not the condition is satisfied is a unique message, but the other registered message is a common message. Therefore, it is possible to provide the same content to the user based on whether or not the condition is satisfied, and it is possible to improve user convenience while consuming less computational and/or communicational resources.

Second Modification of Third Example Embodiment (2)

In the third example embodiment, different registered messages are added to the talk room for the official account based on the number of times a coupon is downloaded using the terminal 20. However, the present disclosure is not limited in this way.

For example, in a non-limiting example, different registered messages may optionally be added to the talk room for the official account based on the number of times the terminal 20 requests that the server 10 add a registered message accompanied by a registered URL (in other words, "the number of accesses" from the terminal 20 to the server 10, accompanied by a registered URL), regardless of whether or not a coupon or the like has been downloaded.

Further, different registered messages may optionally be added to the talk room for the official account based on, instead of or in addition to the number of times the coupon or the like has been downloaded or the number of times the server 10 has been accessed, the frequency with which the coupon or the like has been downloaded or the frequency with which the server 10 has been accessed within a desired (or alternatively, preset) unit period (non-limiting examples of which include one week and one month).

Further, in these cases, it is only desired to be able to aggregate the number and frequency of accesses, and the registered messages do not necessarily have to be related to the coupon.

One example of the effects that can be achieved by the present modification is that the registered messages to be added to the talk storage can be flexibly and appropriately determined based on a condition regarding the number of requests and frequency accompanied by specification information.

Third Modification of Third Example Embodiment (3)

Instead of or in addition to the above, different registered messages may optionally be added to the talk room for the official account based on attribute information regarding the user of the terminal 20.

For example, in a non-limiting example, a registered message is set for each piece of attribute information regarding a user, such as the sex, the age, and the occupation (occupation type). Upon receiving a request to add a registered message accompanied by a registered URL, the controller 11 of the server 10 specifies attribute information regarding the user of the terminal 20. Thereafter, the controller 11 of the server 10 may optionally add the registered message corresponding to the specified attribute information to the talk room for the official account.

One example of the effects that can be achieved by the present modification is that the registered messages to be added to the talk storage can be flexibly and appropriately determined based on, instead of or in addition to the condition regarding the number of times the service information regarding the service provided by the second user has been acquired, a condition regarding the frequency at which the service information regarding the service provided by the second user has been acquired.

Further, one example of the effects that can be achieved by the present modification is that the registered messages to be added to the talk storage can be flexibly and appropriately determined based on attribute information regarding the first user.

Fourth Example Embodiment

A fourth example embodiment is an example in which the message to be added is determined (set) based on the history of page transitions by the terminal 20.

The descriptions in the fourth example embodiment are applicable to any of the other example embodiments and other modifications.

Further, the same components as those already described will be indicated with the same reference numerals and will not be described again.

FIG. 22 is a diagram showing an example of registered message management data according to the fourth example embodiment.

The following description illustrates the data corresponding to the registered message management data contained in the OA operator-specific registered message management data of the OA operator that is associated with the application ID "ac0020" (=shop A), which is shown in the foremost dataset in the OA operator-specific registered message management database 155 in FIG. 7.

In a non-limiting example, this registered message management data stores registered URLs, inflow route identification URLs, texts, and attached images in association with each other.

Each registered URL is a URL corresponding to the registered URL described in the above example embodiments, and is a URL generated by the registered URL generator 111 upon receiving a message from the OA operator device 40.

Each inflow route identification URL is a URL for identifying the inflow route to the landing page of the terminal 20, and is generated by the registered URL generator 111 based on the registered URL and the inflow route to the landing page of the terminal 20.

The inflow route is information indicating the page from which the terminal 20 reaches the landing page, that is, the link source page used by the terminal 20 to reach the landing page. It can also be said that the inflow route indicates the history of page transitions.

In the figure, for the sake of convenience, the inflow route identification URL is shown in a format in which "/& {URL of the inflow source page (https ~)}" is added to the registered URL.

Further, for the sake of convenience, the default inflow route identification URL is shown in a format in which "/&{default}" is added to the registered URL.

The above-described registered URL and inflow route identification URL are examples of specification information according to the present disclosure.

In the present example embodiment, the page to which a transition is made when an advertisement is operated on a page (hereinafter referred to as an "advertisement page") on which an advertisement regarding an OA operator (an advertisement regarding a service provided by the OA operator) is posted is referred to as a "landing page". The URL of the advertisement page is referred to as "advertisement URL", and the URL of the landing page is referred to as a "landing URL". The landing page in the present example embodiment corresponds to the registered URL-posted page in the above-described embodiments.

The first registered URL will be described as an example.

The first inflow route identification URL is the URL when the inflow route is from a page related to sports. A text "20% OFF ALL SPORTS DRINKS" and an attached image corresponding thereto are stored in association with each other, as a first registered message, and a text "FILL OUT THE QUESTIONNAIRE AND GO TO SEE THE TOKYO OLYMPICS!" and an attached image corresponding thereto are stored in association with each other as a second registered message. The inflow route is from a page related to sports, and therefore, this landing page is intended to add a registered message regarding a coupon for sports drink, and add another registered message regarding sports as an additional registered message.

The second inflow route identification URL is the URL when the inflow route is from a page related to gourmet food. A text "TRY OUR NEW FINEST ROASTED COFFEE AT HALF PRICE" and an attached image corresponding thereto are stored in association with each other as a first registered message, and a text "FILL OUT THE QUESTIONNAIRE AND RECEIVE AN INVITATION TO A HOTEL DINNER! . . . " and an attached image corresponding thereto are stored in association with each other as a second registered message. The inflow route is from a page related to gourmet food, and therefore, this landing page is intended to add a registered message regarding a coupon for finest roasted coffee, and add another registered message regarding gourmet food as an additional registered message.

The third inflow route identification URL is a default inflow route identification URL. This URL is used in a case where there is no inflow source page.

In a non-limiting example, the case where there is no inflow source page is a case where the landing page is bookmarked and registered as a favorite on the terminal 20.

Bookmarking is one of the functions of the terminal 20 and means the function of registering the URL of any website in the web browser.

With this function, it is possible to directly display the registered landing page on the terminal 20 without displaying the advertisement page. In this case, there is no inflow source page.

In this example, a text "THANK YOU FOR REGISTERING AS A FAVORITE", and an attached image corresponding thereto are stored in association with each other as a first registered message, a text "20% OFF ALL SPORTS DRINKS" and an attached image corresponding thereto are stored in association with each other, as a second registered message, and a text "TRY OUR NEW FINEST ROASTED COFFEE AT HALF PRICE" and an attached image corresponding thereto are stored in association with each other as a third registered message. The intention here is that, because the landing page may have been bookmarked, the registered message "THANK YOU FOR REGISTERING AS A FAVORITE" is added, and because the inflow source page does not present (in other words, the inflow route cannot be identified), both the registered message regarding the coupon for sports drinks and the registered message regarding the coupon for the finest roasted coffee are added.

Display Screen

FIGS. 22 and 23 are diagrams showing examples of transitions of display screens that are to be displayed on the display 24 of the terminal 20 in the present embodiment.

FIG. 23 shows a state in which a portal site is displayed on the display 24 of the terminal 20. This portal site contains a plurality of categories such as "GENERAL", "NEWS", "SPORTS", "SOCIETY", "ENTERTAINMENT", and so on. This example shows a state in which the "SPORTS" category is selected to display a page on which information regarding sports is posted.

In a non-limiting example, in addition to information regarding sports, this page displays an advertisement for a service provided by the OA operator. For example, in this example, an advertisement indicating that a drink fair is being held at the shop A is displayed. That is, this page is an advertisement page.

Upon the above advertisement being operated by the user of the terminal 20, the transition is made from the advertisement page to the landing page. In this example, the landing page is the web page of the shop A. A friend addition campaign is being held in the messaging application, and the page shows a description indicating that if the user adds the official account of the shop A as a friend in the messaging application, the user can obtain a drink coupon, an advertisement indicating that a drink fair is being held at the shop A, and a campaign participation button indicating "JOIN THE CAMPAIGN" that is to be used to obtain the coupon.

Upon the campaign participation button is operated on this landing page, as in the above-described example embodiments, the talk room for the official account of the shop A in the messaging application installed on the terminal 20 is displayed (1) after the user logs in to the messaging application, or (2) after the user registers the shop A as a friend if the official account of the shop A has not been added as a friend.

In this example, the advertisement page displayed before a transition is made to the landing page is a page related to sports. Therefore, this talk room displays a registered message regarding a coupon for sports drinks.

In addition, in this talk room, a registered message regarding the application for the campaign to obtain a ticket to watch the Tokyo Olympics by answering the questionnaire is displayed as a registered message originating from the official account of the shop A. That is, because the advertisement page before a transition is made to the landing page is a page related to sports, a different registered message regarding sports is displayed in addition to the registered message regarding the coupon for sports drinks.

FIG. 24 shows a state in which a gourmet food site is displayed on the display 24 of the terminal 20.

In a non-limiting example, in addition to information regarding gourmet food, this gourmet food site displays an advertisement of the OA operator that has an official account in the messaging application. For example, in this example, as in FIG. 23, an advertisement indicating that a drink fair is being held at the shop A is displayed. That is, this page is an advertisement page.

Upon the advertisement being operated by the user of the terminal 20, the transition is made from the gourmet food site to the landing page. In this example, the landing page is the same page as that shown in FIG. 23.

Upon the campaign participation button is operated on this landing page, as in the above-described example embodiments, the talk room for the official account of the shop A in the messaging application installed on the terminal 20 is displayed (1) after the user logs in to the messaging application, or (2) after the user registers the shop A as a friend, if the official account of the shop A has not been added as a friend.

In this example, the advertisement page displayed before a transition is made to the landing page is a page related to gourmet food. Therefore, this talk room shows a registered message regarding a coupon for the finest roasted coffee.

In addition, in this talk room, a registered message regarding the application for the campaign to obtain a ticket for hotel dinner by answering the questionnaire is displayed as a registered message originating from the official account of the shop A. That is, because the advertisement page before a transition is made to the landing page is a page related to gourmet food, a different registered message regarding gourmet food is displayed in addition to the registered message regarding the coupon for the finest roasted coffee.

Processing

Figure 25:
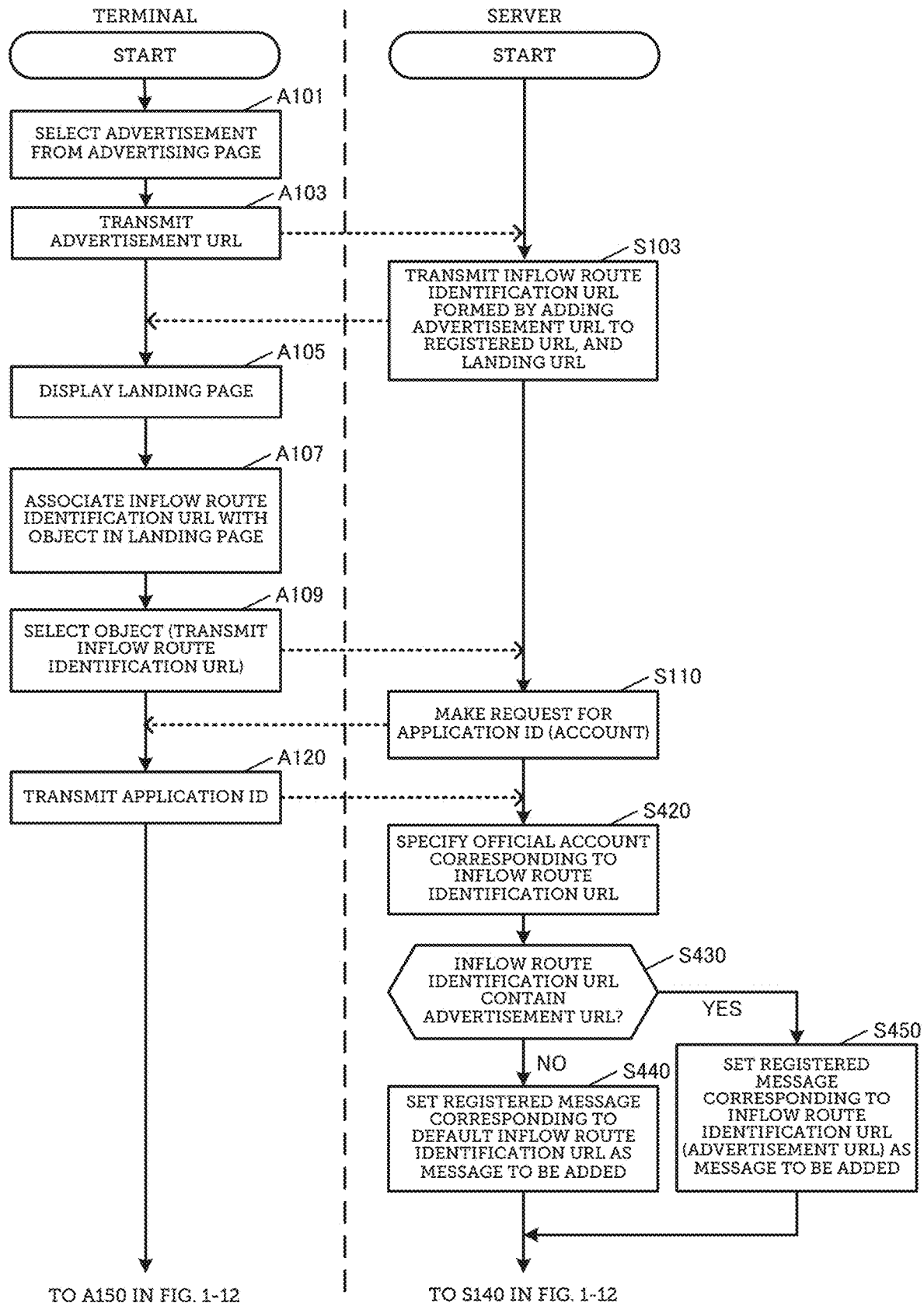
FIG. 25 is a flowchart showing an example flow of processing that is performed by devices according to the fourth example embodiment.

FIG. 25 is a flowchart showing an example flow of processing that is performed by the devices according the present fourth example embodiment. In this figure, processing that is performed by the controller 21 of a terminal 20 is shown on the left side, and processing that is performed by the controller 11 of the server 10 is shown on the right side.

Here, the description is based on the assumption that the user of the terminal 20 (a general account) and an OA operator (an official account) have already been registered as friends in the messaging application.

First, the controller 21 of the terminal 20 selects an advertisement posted on the advertisement page according to the user's operation on the input/output part 23 (A101). Thereafter, the controller 21 of the terminal 20 transmits the advertisement URL of the selected advertisement page to the server 10 using the communication I/F 22 (A103).

In response, the controller 11 of the server 10 specifies, based on the advertisement URL received from terminal 20, the registered URL associated with the advertisement on the advertisement page specified by the advertisement URL. Thereafter, the registered URL generator 111 of the server 10 generates an inflow route identification URL by adding the advertisement URL to the specified registered URL, and transmits the generated inflow route identification URL and the landing URL to the terminal 20 using the communication I/F 14 (S103).

The controller 21 of the terminal 20 displays the landing page on the display 24 based on the landing URL received from the server 10 (A105).

In a non-limiting example, the landing page includes an object related to the advertisement selected in A101. The object need only be an object that can receive a user operation, and non-limiting examples of which include a button, an icon, and so on.

One example of this object is the campaign participation button shown in FIGS. 23 and 24.

Thereafter, the controller 21 of the terminal 20 associates the inflow route identification URL received from the server 10 with the object in the above-described landing page (A107).

In a non-limiting example, the default inflow route identification URL is associated with the object. In A107, the default inflow route identification URL associated with the object is overwritten and updated with the inflow route identification URL received from the server 10.

Thereafter, upon the object being operated by the user via the input/output part 23, the controller 21 of the terminal 20 transmits the inflow route identification URL associated with the operated object to the server 10, using the communication I/F 22 (A109).

Upon receiving the inflow route identification URL from the terminal 20 using the communication I/F 14, the controller 11 of the server 10 performs the processing in S110.

Further, the controller 21 of the terminal 20 performs the processing in A120. Thereafter, the controller 21 of the terminal 20 advances processing to A150.

Upon receiving the application ID from the terminal 20 using the communication I/F 14, the registered message specifier 115 (the registered message manager 114) of the server 10 references the OA operator-specific registered message management database 155 stored in the storage 15, and specifies the official account corresponding to the inflow route identification URL received from the terminal 20 (S420).

Thereafter, the controller 11 of the server 10 determines whether or not an advertisement URL is contained in the inflow route identification URL received from the terminal 20 (S430).

Here, if S430 is reached after the processing in A101 to A107 by the terminal 20 and the processing in S103 by the server 10 have been performed, the inflow route identification URL received from the terminal 20 includes an advertisement URL.

On the other hand, as described above, if the landing page URL is bookmarked on the terminal 20, the terminal 20 starts processing from A105 and skips the processing in A107. Thus, the inflow route identification URL transmitted from the terminal 20 to the server 10 in A109 is the default inflow route identification URL, which means that the inflow route identification URL received from the terminal 20 does not contain an advertisement URL.

If it is determined that the inflow route identification URL does not contain an advertisement URL (S430: NO), the controller 11 of the server 10 sets the registered message corresponding to the default inflow route identification URL as the message to be added (S440). Thereafter, the controller 11 of the server 10 advances processing to S140.

On the other hand, if it is determined that an advertisement URL is contained in the inflow route identification URL (S430: YES), the controller 11 of the server 10 sets the registered message to correspond to the inflow route identification URL (the advertisement URL) (e.g., the registered message corresponding to the inflow route), as the message to be added (S450). Thereafter, the controller 11 of the server 10 advances processing to S140.

Effects

The fourth example embodiment shows a configuration with which the controller 11 of the server 10 determines the message to be added, based on a condition regarding the history of transitions to the landing page (a non-limiting example of the posting location to which specification information is posted) (a non-limiting example of a condition regarding the posting location to which specification information is posted, an example of a condition regarding the history of transitions to the posting location to which specification information is posted).

One example of the effects that can be achieved by such a configuration is that the registered message to be added to the talk storage can be determined based on a condition regarding the history of transitions to the posting location to which specification information is posted, and therefore, in a non-limiting example, it is possible to add the same registered message for the same history of transitions, and add different registered messages for different histories of transitions. That is, it is possible to perform different controls depending on the purpose and motive of the user to acquire the registered message associated with the specification information, and it is possible to improve user convenience.

The fourth example embodiment also shows a configuration with which the controller 11 of the server 10 adds, to the talk storage, a registered message that is associated with the registered URL and that corresponds to the type of the page that has been displayed on the terminal 20 before a transition has been made to the landing page (a non-limiting example of the posting location to which specification information is posted).

One example of the effects that can be achieved by such a configuration is that a registered message that is associated with specification information and that corresponds to the type of the page that has been displayed before a transition has been made to the posting location to which the specification information is posted can be added to the talk storage, and therefore different controls can be performed depending on the purpose and motive of the user to acquire the registered message, and user convenience can be improved.

Further, in the above description, the fourth example embodiment shows a configuration with which the controller 11 of the server 10 adds, in addition to a registered message that is associated with the registered URL and that corresponds to the type of the page that has been displayed on the terminal 20 before a transition has been made to the landing page, another registered message of the same type, to the talk storage.

One example of the effects that can be achieved by such a configuration is that, in addition to a registered message that is associated with specification information and that corresponds to the type of the page that has been displayed before a transition has been made to the posting location to which the specification information is posted, another registered message of the same type can be added to the talk storage, and therefore information of the same type can be additionally provided to the user, and user convenience can be further improved.

First Modification of Fourth Example Embodiment (1)

In the fourth example embodiment, instead of determining the message to be added based on the history of transitions to the landing page, the controller 11 of the server 10 may optionally determine the message to be added based on the type of the landing page.

For example, if the type of the landing page is a page related to sports, the same registered message as that shown in FIG. 23 is set as the message to be added, and if the type of the landing page is a page related to gourmet food, the same registered message as that shown in FIG. 4-3 is set as the message to be added.

The present first modification shows a configuration with which the controller 11 of the server 10 determines the message to be added, based on the type of the landing page (a non-limiting example of a condition regarding the posting location where specification information is posted).

One example of the effects that can be achieved by such a configuration is that the registered message to be added to the talk storage can be determined based on a condition such as the type of the posting location to which specification information is posted, and therefore, in a non-limiting example, it is possible to add the same registered message for the same type of the posting location to which specification information is posted, and it is possible to add different registered messages for different types of posting locations to which specification information is posted. That is, it is possible to perform different control depending on the purpose and motive of the user to acquire the registered message associated with the specification information, and it is possible to improve user convenience.

Second Modification of Fourth Example Embodiment (2)

In the fourth example embodiment, some of the plurality of registered messages may be the same or different depending on the inflow route.

For example, in a non-limiting example, in the example shown in FIG. 22, the first registered message of the two registered messages associated with the first inflow route identification URL and the second inflow route identification URL, the first registered message may be the common message (a non-limiting example of which is the "20% off all sports drinks" coupon), and only the second registered message (questionnaire application) may be varied.

In addition, the number of registered messages corresponding to an inflow route may be different for each inflow route.

For example, in a non-limiting example, in the example shown in FIG. 22, one registered message (a non-limiting example of which is the "20% off all sports drinks" coupon) may be associated with the first inflow route identification URL and two registered messages (a non-limiting example of which is the "finest roasted coffee half price" coupon+questionnaire application, or the "20% off all sports drinks" coupon+the "finest roasted coffee half price" coupon) may be associated with the second inflow route identification URL.

Third Modification of Fourth Example Embodiment (3)

In the fourth example embodiment, an inflow route identification URL is associated with the object in the landing page so that the server 10 can identify the inflow route. However, the present disclosure is not limited in this way.

In addition, in a non-limiting example, the server 10 may optionally identify the inflow route based on a "referrer" that is a kind of data recorded in an access log and is a kind of information regarding the link source page used when the user reaches the landing page.

Fifth Example Embodiment

The fifth example embodiment is an example of aggregating information on the trend of addition requests to the server 10 and the trend of downloading coupon information or the like in the above-described example embodiment.

The descriptions in the fifth example embodiment are applicable to any of the other example embodiments and other modifications.

Further, the same components as those already described will be indicated with the same reference numerals and will not be described again.

Data Structure

FIG. 26 is a diagram showing an example of access history data 158 stored in the storage 15 of the server 10 in the present fifth example embodiment.

In a non-limiting example, the access history data 158 stores access dates, registered URLs, application IDs (general accounts) and pieces of attribute information in time series in association with each other.

Each access date stores the date when an addition request (access) accompanied by a registered URL is made from the terminal 20.

Each registered URL stores the registered URL specified by the addition request corresponding thereto.

Each application ID stores the application ID (general account) of the user of the terminal 20 that has made the request.

Each piece of attribute information stores attribute information regarding the user of the terminal 20 that has made the request.

FIG. 27 shows an example of official account-specific aggregated data 159 according to the present fifth example embodiment.

The account-specific aggregated data 159 is data that is used by the server 10 to aggregate information regarding requests (accesses) from the terminal 20 accompanied by the registered URLs, for each OA operator's official account.

The following description illustrates the account-specific aggregated data 159 corresponding to the official account name (the shop A) of the OA operator associated with the application ID "ac0020" (=shop A), which is shown in the foremost dataset in the OA operator-specific registered message management database 155 in FIG. 7.

In a non-limiting example, the account-specific aggregated data 159 includes the official account name, and a plurality of pieces of registered URL-specific aggregated data that are pieces of registered URL-specific aggregated data stored in the registered messages management data (see FIG. 7) corresponding to the official account name.

Each piece of registered URL-specific aggregated data contains a registered URL, individual access count aggregated data, and total access count aggregated data, which are non-limiting examples.

Individual access count aggregated data is data formed by aggregating the access count for each aggregation item such as attribute information or a time zone, and aggregation items and access counts, which are non-limiting examples, are stored therein in association with each other.

Total access count aggregated data is data generated based on individual access count aggregated data, and is total data for counting the number of accesses for each combination of attribute information and a time zone, in a non-limiting example.

Processing

The controller 11 of the server 10 references the user registration data 152 (FIG. 4) based on a request to add a registered message from a terminal 20 accompanied by a registered URL, to specify the application ID (a general account) of the user of the terminal 20 and attribute information. Thereafter, the controller 11 stores the access date, the registered URL corresponding to the request, the specified application ID, and the specified attribute information in the access history data 158 (FIG. 26) in association with each other.

The controller 11 of the server 10 performs access count aggregation processing at a desired (or alternatively, predetermined) aggregation timing (a non-limiting example of which is a regular timing such as once a week, once a month, or the like).

Note that the aggregation timing is not limited to a regular timing, and may be an irregular timing, a timing at which the aggregation operation is manually performed, or the like.

In a non-limiting example, in access count aggregation processing, the controller 11 of the server 10 counts the number of accesses for each aggregation item such as information regarding the access time zone and attribute information regarding the user of the terminal 20, for each OA operator's official account, based on the access history data 158 at the aggregation timing (the latest access history data 158) and the user registration data 152, and stores the number of accesses in the individual access count aggregated data.

In addition, the controller 11 of the server 10 counts the number of accesses for each combination of attribute information and a time zone based on the individual access count aggregated data, and stores the numbers of accesses in the total access count aggregated data.

In a non-limiting example, the aggregated data that has been aggregated through access count aggregation processing (the individual access count aggregated data and the total access count aggregated data) may be transmitted by the controller 11 of the server 10 to the OA operator device 40, using the communication I/F 14. With such a configuration, the OA operator can check and grasp the aggregated data.

Note that, instead of or in addition to counting the number of accesses, it is possible to count the number of downloads of the above-described coupon information or the like.

Further, instead of or in addition to counting the number of accesses or downloads, it is possible to count the frequency of accesses or the frequency of downloads.

Effects

The present fifth example embodiment shows a configuration with which the controller 11 of the server 10 aggregates the trend in requests to add a registered message (accesses to the server 10) (a non-limiting example of information regarding requests accompanied by user identification information and specification information).

One example of the effects that can be achieved by such a configuration is that it is possible to aggregate information regarding the trend in requests accompanied by user identification information and specification information, and therefore, in a non-limiting example, the messaging service operator and the OA providers can grasp information such as which registration URL was selected by what user in which time zone (what kind of reaction was received regarding which campaign). Thus, the quality of services provided by OA operators can be improved or enhanced.

Other Example Embodiments (1) Specification Information

In the above-described example embodiments, URLs are illustrated as specification information that is associated with registered messages. However, the present disclosure is not limited in this way. Specification information need only be unique information that can specify each registered message, and non-limiting examples of which include a token, a hash value, and so on. In this case, the controller 21 of the terminal 20 acquires specification information such as a token or a hash value using any given method. Thereafter, the controller 21 of the terminal 20 communicably connects to the server 10 according to a user operation, and transmits the acquired specification information to the server 10, using the communication I/F 22.

The controller 11 of the server 10 specifies the official account and the registered message associated with the specification information received from the terminal 20, and adds the specified registered message to the talk room for the specified official account.

(2) Association of Specification Information and a Registered Message with Each Other In the above example embodiment, the controller 11 of the server 10 stores specification information and a registered message in the storage 15 in association with each other. However, the present disclosure is not limited in this way. That is, specification information and a registered message do not necessarily have to be stored in the storage 15 in association with each other.

In a non-limiting example, for each of the messages (registered messages) acquired from the OA operator device 40, the controller 11 of the server 10 generates information that is unique and with the data of which the registered message can be reversibly restored (Hereinafter referred to as "restorable information").

In this case, the controller 21 of the terminal 20 acquires restorable information, using any given method. In a non-limiting example, the controller 21 of the terminal 20 downloads and acquires the restorable information from the website of the OA operator. Thereafter, the controller 21 of the terminal 20 communicably connects to the server 10 according to a user operation, and transmits information for making a request to add a registered message, including the acquired restorable information, to the server 10, using the communication I/F 22.

In response to this addition request, the controller 11 of the server 10 restores a registered message from the restorable information received from the terminal 20, and adds the restored registered message to the talk room for the official account corresponding thereto.

(3) System

The configuration of the communication system 1A in the above-described example embodiments is merely an example, and the present disclosure is not limited in this way. In a non-limiting example, part or all of the processing performed by the server 10 (a non-limiting example of the information processing device) in the communication system 1A may be performed by another device.

Figure 28:
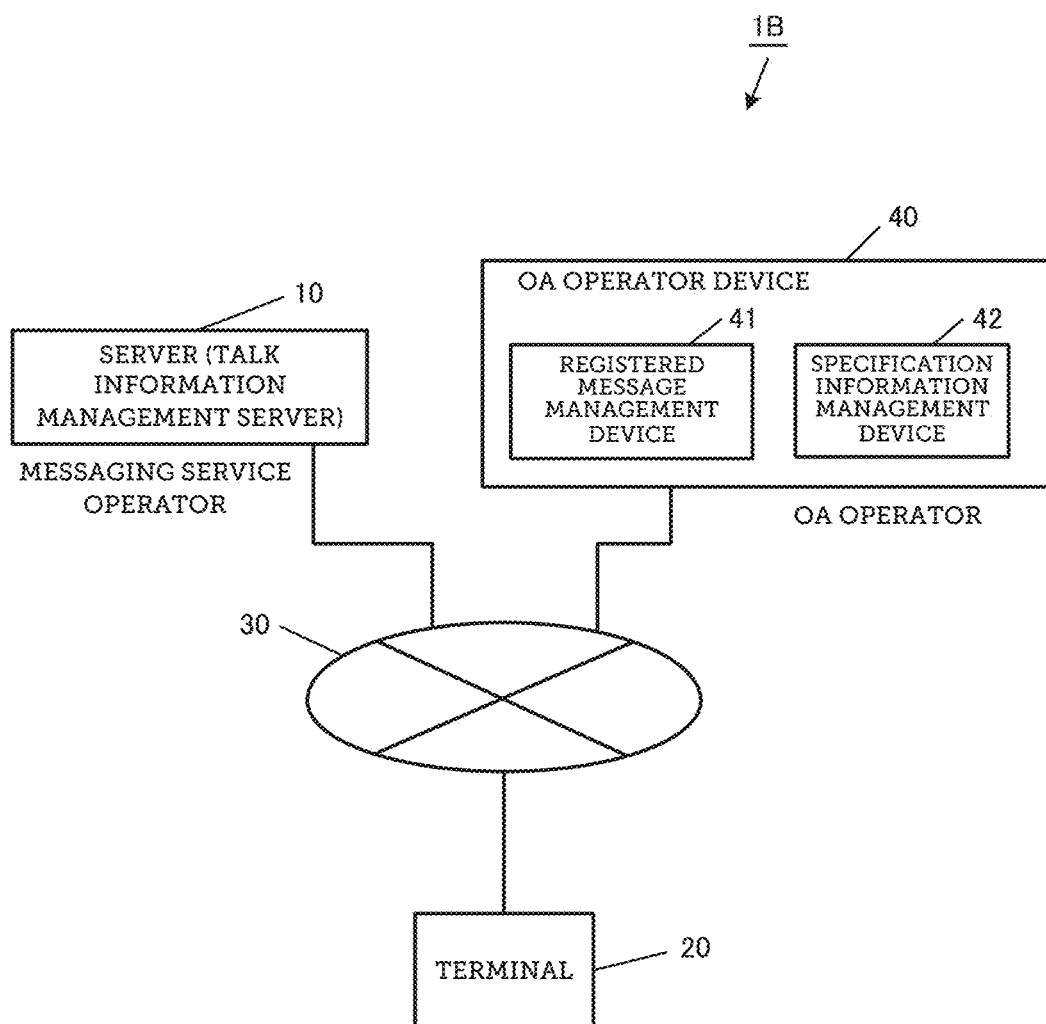
FIG. 28 is a diagram showing an example of a system configuration of a communication system in another aspect of an example embodiment.

FIG. 28 is a diagram showing an example of a system configuration of a communication system 1B according to another aspect of an example embodiment.

In the communication system 1B, the server 10 of the messaging service operator functions as a talk information management server that manages talk information, in a non-limiting example.

Further, in the communication system 1B, each OA operator device 40 includes a registered message management device 41 and a specification information management device 42, in a non-limiting example.

In the communication system 1B, a controller included in the registered message management device 41 generates one or more registered messages, in a non-limiting example. Thereafter, upon receiving one or more registered messages from the registered message management device 41, the controller of the specification information management device 42 outputs specification information that specifies the one or more registered messages. That is, in a non-limiting example, the controller performs control to generate specific information that specifies one or more registered messages received from the registered message management device 41, display the generated specific information, transmit data (association data) that associates the specific information with the one or more registered messages to the server 10, and so on.

Note that the association data may be stored in either the registered message management device 41 or the specification information management device 42.

Further, in a non-limiting example, the server 10 (the talk information management server) includes a talk storage. The controller 11 of the server 10 references the association data received from the OA operator device 40, and adds the first registered message specified by the first specification information to the talk storage, based on a request accompanied by the first user identification information and the first specification information included in the specification information, and adds the second registered message specified by the second specification information to the talk storage, based on a request accompanied by the second user identification information and the second specification information included in the specification information.

Note that the above-described configuration is merely an example, and the present disclosure is not limited to such a configuration.

In a non-limiting example, based on a request accompanied by the first user identification information and the specification information, the controller 11 of the server 10 transmits the specification information to the specification information management device 42. The specification information management device 42 may indirectly perform control to add the registered message to the talk storage by, for example, specifying the registered message associated with the specific information received from the server 10, based on the association data, and transmitting a command to the server 10, instructing the server 10 to add the specified registered message to the talk storage.

That is, the system according to the present disclosure does not necessarily have to include only one controller (control device), and may include a plurality of controllers (a plurality of control devices). The plurality of controllers may share and perform various kinds of control.

In addition, the talk storage in the present disclosure may be provided in an external device outside the server 10. The device provided with the talk storage may be a device of a messaging service operator or an OA operator.

That is, in the system according to the present disclosure, the talk storage may be provided in a device other than the server 10 (the information processing device).

Any functional blocks shown in the figures and described above may be implemented in processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

What is claimed is:

1. A system that includes at least an information processing device for providing a messaging service, the system comprising:

a talk storage configured to store talk information in association with first user identification information, the talk information including a message from a second user to a first user, the first user identification information identifying the first user; and processing circuitry configured to based on an acquisition of one or more registered messages, output specification information that specifies the one or more registered messages, based on each of one or more first requests accompanied by the first user identification information and first specification information that is included in the specification information, add a first registered message specified by the first specification information, from among the one or more registered messages, to the talk storage, and based on each of one or more second requests accompanied by the first user identification information and second specification information that is included in the specification information, add a second registered message specified by the second specification information, from among the one or more registered messages, to the talk storage.

2. The system according to claim 1,
wherein the talk storage is further configured to store the talk information that includes the message from the second user that is identified by second user identification information of a second type, to the first user, in association with the first user identification information of a first type.

3. The system according to claim 1,
wherein the processing circuitry is further configured to add one registered message of a plurality of first registered messages specified by the first specification information, to the talk storage.

4. The system according to claim 3,
wherein the processing circuitry is further configured to add one registered message of a plurality of second registered messages specified by the second specification information, to the talk storage.

5. The system according to claim 4,
wherein at least one message of the plurality of first registered messages and at least one message of the plurality of second registered messages are identical.

6. The system according to claim 3,
wherein the processing circuitry is further configured to determine a registered message that is to be added to the talk storage, based on one or more conditions.

7. The system according to claim 6,
wherein the one or more conditions include a condition regarding a number or a frequency of at least one of the one or more first requests or the one or more second requests.

8. The system according to claim 6,
wherein service information regarding a service provided by the second user is associated with the registered message, and
the one or more conditions include a condition regarding a number of times or a frequency with which the service information associated with the registered message is acquired based on the registered message having been added to the talk storage.

9. The system according to claim 6,
wherein the one or more conditions include a condition regarding a posting location to which the specification information is posted.

10. The system according to claim 9,
wherein the one or more conditions include a condition regarding a history of transitions to the posting location.

11. The system according to claim 1, further comprising an aggregator configured to aggregate information regarding a trend in at least one of the one or more first requests or the one or more second requests.

12. An information processing method for a system including at least an information processing device for providing a messaging service, the information processing method comprising:

storing, in a talk storage of the system, talk information in association with first user identification information, the talk information including a message from a second user to a first user, the first user identification information identifying the first user;

based on an acquisition of one or more registered messages, outputting, by processing circuitry included in the system, specification information that specifies the one or more registered messages, based on each of one or more first requests that is accompanied by the first user identification information and first specification information that is included in the specification information, adding, by the processing circuitry, a first registered message specified by the first specification information, from among the one or more registered messages, to the talk storage; and based on each of one or more second requests that is accompanied by the first user identification information and second specification information that is included in the specification information, adding, by the processing circuitry, a second registered message specified by the second specification information, from among the one or more registered messages, to the talk storage.

13. An information processing device for providing a messaging service, the information processing device comprising:

a talk storage configured to store talk information in association with first user identification information, the talk information including a message from a second user to a first user, the first user identification information identifying the first user; and processing circuitry configured to,
based on an acquisition of one or more registered messages, output specification information that specifies the one or more registered messages, based on each of one or more first requests that is accompanied by the first user identification information and first specification information that is included in the specification information, add a first registered message specified by the first specification information, from among the one or more registered messages, to the talk storage, and based on each of one or more second requests that is accompanied by the first user identification information and second specification information that is included in the specification information, add a second registered message specified by the second specification information, from among the one or more registered messages, to the talk storage.

14. A non-transitory computer-readable record medium storing instructions thereon, which when executed by an information processing device for providing a messaging service, causes the information processing device to implement an information processing method, to the method comprising:

storing, in a talk storage of the information processing device, talk information in association with first user identification information, the talk information including a message from a second user to a first user, the first user identification information identifying the first user;

based on an acquisition of one or more registered messages, outputting specification information that specifies the one or more registered messages;

based on each of one or more first requests that is accompanied by the first user identification information and first specification information that is included in the specification information, adding a first registered message specified by the first specification information, from among the one or more registered messages, to the talk storage; and based on each of one or more second requests that is accompanied by the first user identification information and second specification information that is included in the specification information, adding a second registered message specified by the second specification information, from among the one or more registered messages, to the talk storage.

15. A terminal configured to perform processing related to a messaging service, the terminal comprising:

a talk storage configured to store talk information in association with first user identification information, the talk information including a message from a second user to a first user, the first user being a user of the terminal, the first user identification information identifying the first user; and processing circuitry configured to acquire specification information to specify one or more registered messages that are specified by the specification information, based on each of one or more first requests that is accompanied by the first user identification information and first specification information that is included in the specification information, add a first registered message specified by the first specification information, from among the one or more registered messages, to the talk storage, and based on each of one or more second requests that is accompanied by the first user identification information and second specification information that is included in the specification information, add a second registered message specified by the second specification information, from among the one or more registered messages, to the talk storage.

16. A non-transitory computer-readable record medium storing instructions thereon, which when executed by processing circuitry, to cause a terminal to implement an information processing method, the method comprising:

storing, in a talk storage of the terminal, talk information in association with first user identification information, the talk information including a message from a second user to a first user, the first user being a user of the terminal, the first user identification information identifying the first user;

acquiring specification information to specify one or more registered messages that are specified by the specification information;

based on each of one or more first requests that is accompanied by the first user identification information and first specification information that is included in the specification information, adding a first registered message specified by the first specification information, from among the one or more registered messages, to the talk storage; and based on each of one or more second requests that is accompanied by the first user identification information and second specification information that is included in the specification information, adding a second registered message specified by the second specification information, from among the one or more registered messages, to the talk storage.

* * * * *